(12) United States Patent　　　(10) Patent No.:　US 12,632,987 B1
Naik　　　　　　　　　　　　　　(45) Date of Patent:　　May 19, 2026

(54) SYSTEMS AND METHODS FOR FACILITATING AUTONOMOUS OPERATION OF A NON-VIRTUAL MARINE VESSEL IN AN EXTENDED REALITY ENVIRONMENT THAT INCLUDES A VIRTUAL OBJECT

(71) Applicant: Brunswick Corporation, Mettawa, IL (US)

(72) Inventor: Aadish Dilip Naik, Chicago, IL (US)

(73) Assignee: Brunswick Corporation, Mettawa, IL (US)

( * ) Notice: Subject to any disclaimer, the term of this patent is extended or adjusted under 35 U.S.C. 154(b) by 121 days.

(21) Appl. No.: 18/612,785

(22) Filed: Mar. 21, 2024

(51) Int. Cl.
| | |
|---|---|
| *G06T 7/73* | (2017.01) |
| *B63B 79/40* | (2020.01) |
| *G06T 7/11* | (2017.01) |
| *G06T 15/20* | (2011.01) |
| *G06T 17/00* | (2006.01) |
| *G06T 19/00* | (2011.01) |
| *G06V 20/50* | (2022.01) |
| *H04N 13/204* | (2018.01) |

(52) U.S. Cl.
CPC ............... *G06T 7/75* (2017.01); *B63B 79/40* (2020.01); *G06T 7/11* (2017.01); *G06T 15/20* (2013.01); *G06T 17/00* (2013.01); *G06T 19/00* (2013.01); *G06V 20/50* (2022.01); *H04N 13/204* (2018.05); *G06T 2207/10012* (2013.01); *G06T 2207/10028* (2013.01); *G06T 2207/30261* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 9,751,607 B1 | 9/2017 | Kollman et al. | |
| 10,204,456 B2 | 2/2019 | Kudirka et al. | |
| 10,259,555 B2 | 4/2019 | Ward et al. | |
| 11,600,184 B2 | 3/2023 | Derginer et al. | |
| 11,983,972 B1 * | 5/2024 | Nygaard | G07C 5/0841 |
| 12,254,244 B1 * | 3/2025 | Veiga | G06T 19/20 |
| 2020/0020171 A1 | 1/2020 | Hendricks et al. | |

(Continued)

OTHER PUBLICATIONS

Unpublished U.S. Appl. No. 18/302,602, filed Apr. 18, 2023 by Lee Rosario et al.

(Continued)

*Primary Examiner* — Frank S Chen
(74) *Attorney, Agent, or Firm* — Andrus Intellectual Property Law, LLP

(57)　　　　　　ABSTRACT

A system for placing a virtual object in an environment of a non-virtual marine vessel is provided, the system comprising: one or more hardware processors configured to: receive an instruction to add a virtual object to a model of the environment used to facilitate one or more autonomous operations of the non-virtual marine vessel; receive information indicative of an object position and object orientation at which to place the virtual object within the environment with respect to the marine vessel; and add data that represents the virtual object to the model, such that an autonomy system of the non-virtual marine vessel identifies the virtual object as a non-virtual object in the environment.

20 Claims, 11 Drawing Sheets

(56)                    References Cited

U.S. PATENT DOCUMENTS

| 2020/0090367 | A1  | 3/2020  | Nishiyama |               |
|--------------|-----|---------|-----------|---------------|
| 2020/0257931 | A1* | 8/2020  | Yershov   | B60W 60/0011  |
| 2021/0089058 | A1* | 3/2021  | Stoschek  | G08G 5/80     |
| 2022/0076670 | A1* | 3/2022  | Marti     | G01S 15/931   |
| 2024/0380874 | A1* | 11/2024 | Clemens   | H04N 13/221   |

OTHER PUBLICATIONS

BMW M Mixed Reality Experience, https://www.bmw-m.com/en/fastlane/driving-experience/bmw-m-mixed-reality.html, accessed Oct. 23, 2023.

MCity 2.0, https://mcity.umich.edu/our-work/mcity-test-facility/mcity-2/, accessed Oct. 23, 2023.

Volvo Press Release No. 253105, https://www.media.volvocars.com/global/en-gb/media/pressreleases/253105/volvo-cars-and-varjo-launch-world-first-mixedreality-application-for-car-development, Mar. 29, 2019.

Unpublished U.S. Appl. No. 18/397,036, filed Dec. 27, 2023 by Aadish Dilip Naik.

* cited by examiner

400

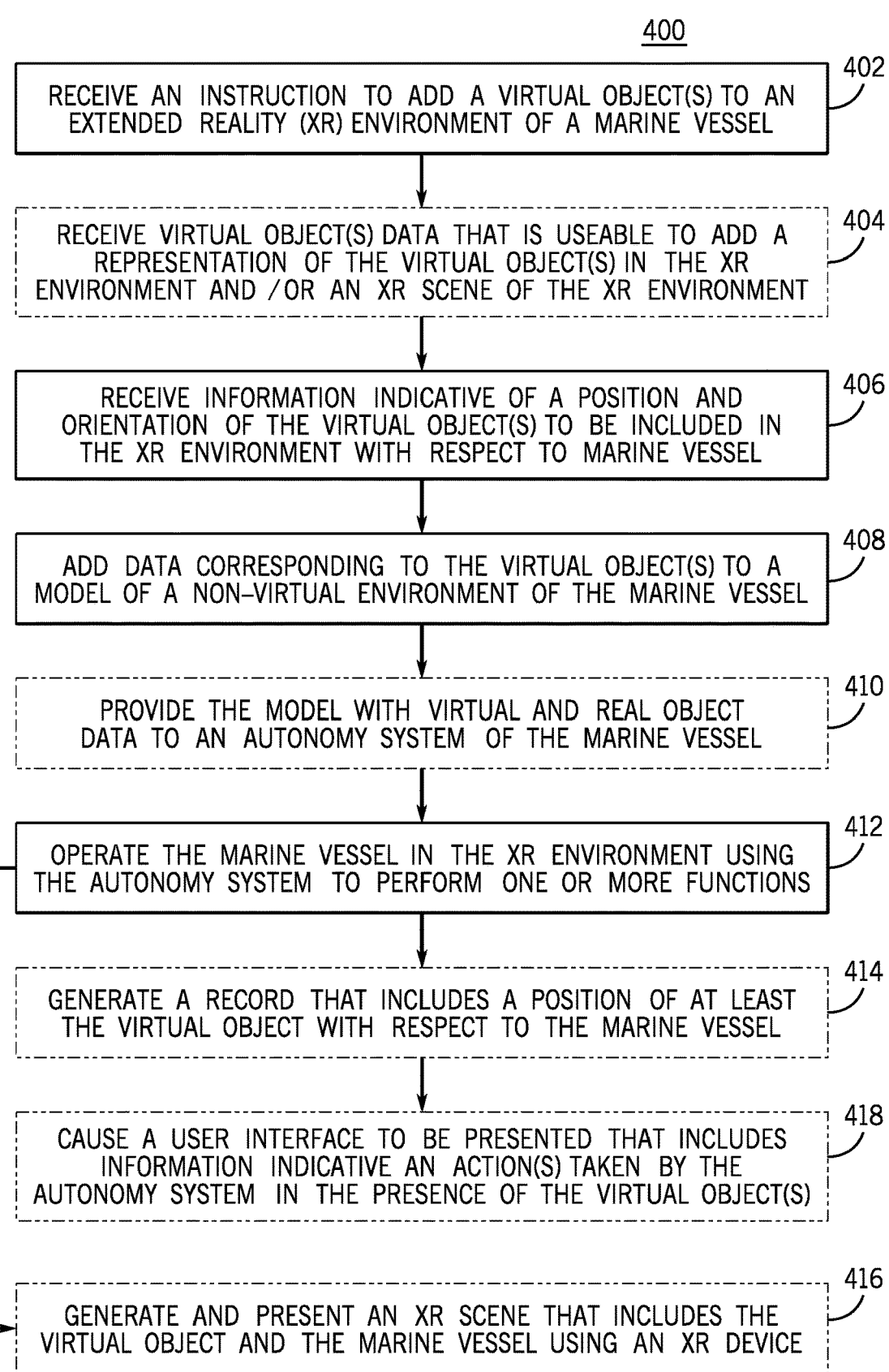

RECEIVE AN INSTRUCTION TO ADD A VIRTUAL OBJECT(S) TO AN EXTENDED REALITY (XR) ENVIRONMENT OF A MARINE VESSEL ⟩ 402

RECEIVE VIRTUAL OBJECT(S) DATA THAT IS USEABLE TO ADD A REPRESENTATION OF THE VIRTUAL OBJECT(S) IN THE XR ENVIRONMENT AND / OR AN XR SCENE OF THE XR ENVIRONMENT ⟩ 404

RECEIVE INFORMATION INDICATIVE OF A POSITION AND ORIENTATION OF THE VIRTUAL OBJECT(S) TO BE INCLUDED IN THE XR ENVIRONMENT WITH RESPECT TO MARINE VESSEL ⟩ 406

ADD DATA CORRESPONDING TO THE VIRTUAL OBJECT(S) TO A MODEL OF A NON-VIRTUAL ENVIRONMENT OF THE MARINE VESSEL ⟩ 408

PROVIDE THE MODEL WITH VIRTUAL AND REAL OBJECT DATA TO AN AUTONOMY SYSTEM OF THE MARINE VESSEL ⟩ 410

OPERATE THE MARINE VESSEL IN THE XR ENVIRONMENT USING THE AUTONOMY SYSTEM TO PERFORM ONE OR MORE FUNCTIONS ⟩ 412

GENERATE A RECORD THAT INCLUDES A POSITION OF AT LEAST THE VIRTUAL OBJECT WITH RESPECT TO THE MARINE VESSEL ⟩ 414

CAUSE A USER INTERFACE TO BE PRESENTED THAT INCLUDES INFORMATION INDICATIVE AN ACTION(S) TAKEN BY THE AUTONOMY SYSTEM IN THE PRESENCE OF THE VIRTUAL OBJECT(S) ⟩ 418

GENERATE AND PRESENT AN XR SCENE THAT INCLUDES THE VIRTUAL OBJECT AND THE MARINE VESSEL USING AN XR DEVICE ⟩ 416

FIG. 4

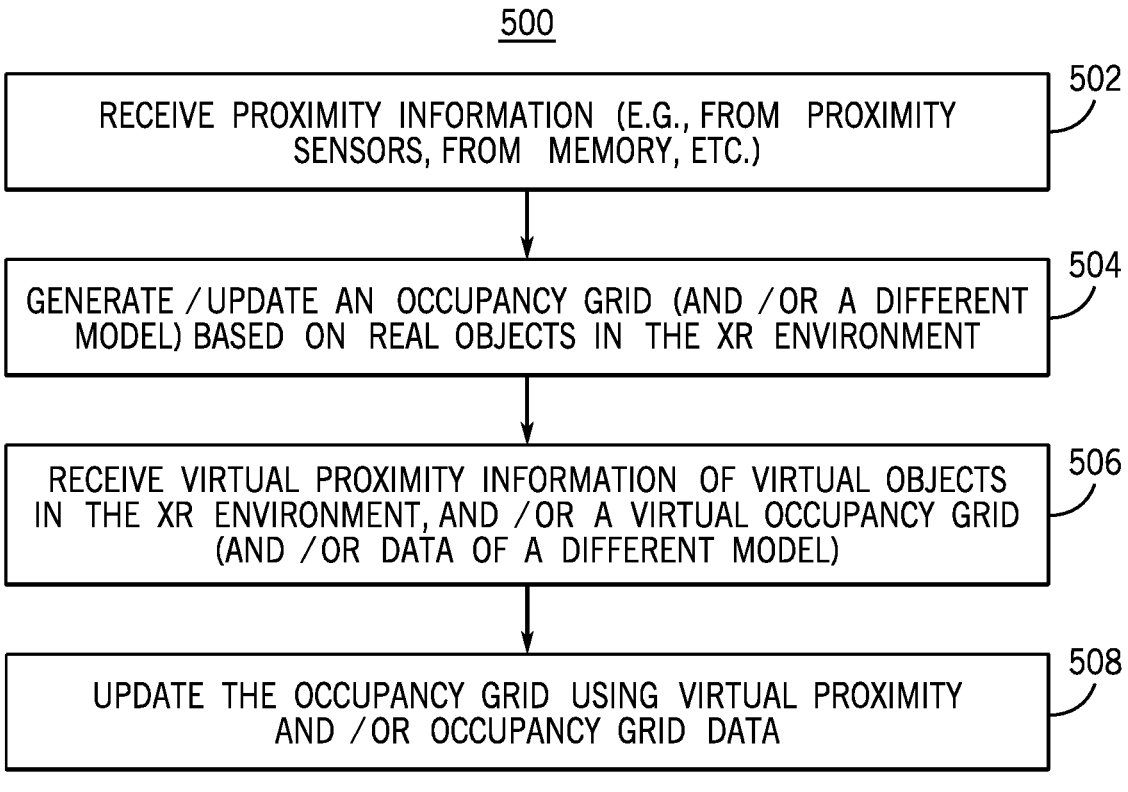

500

502
RECEIVE PROXIMITY INFORMATION (E.G., FROM PROXIMITY SENSORS, FROM MEMORY, ETC.)

504
GENERATE / UPDATE AN OCCUPANCY GRID (AND / OR A DIFFERENT MODEL) BASED ON REAL OBJECTS IN THE XR ENVIRONMENT

506
RECEIVE VIRTUAL PROXIMITY INFORMATION OF VIRTUAL OBJECTS IN THE XR ENVIRONMENT, AND / OR A VIRTUAL OCCUPANCY GRID (AND / OR DATA OF A DIFFERENT MODEL)

508
UPDATE THE OCCUPANCY GRID USING VIRTUAL PROXIMITY AND / OR OCCUPANCY GRID DATA

602
RECEIVE PROXIMITY INFORMATION (E.G., FROM PROXIMITY SENSORS, FROM MEMORY, ETC.) OF REAL OBJECTS IN THE XR ENVIRONMENT

604
RECEIVE VIRTUAL PROXIMITY INFORMATION OF VIRTUAL OBJECTS IN THE XR ENVIRONMENT

606
GENERATE / UPDATE AN OCCUPANCY GRID BASED ON REAL OBJECTS AND VIRTUAL OBJECTS IN THE XR ENVIRONMENT

FIG. 6

SYSTEMS AND METHODS FOR FACILITATING AUTONOMOUS OPERATION OF A NON-VIRTUAL MARINE VESSEL IN AN EXTENDED REALITY ENVIRONMENT THAT INCLUDES A VIRTUAL OBJECT

FIELD

The present disclosure generally relates to systems and methods for facilitating autonomous operation of a non-virtual marine vessel in an extended reality environment that includes a virtual object.

BACKGROUND

The following U.S. Patents are incorporated herein by reference, in entirety:

U.S. Pat. No. 9,751,607 discloses a control system of a marine vessel includes a vessel control unit that controls the rotational position of at least one rotatable device on the marine vessel, and a head-mounted display in data communication with the vessel control unit. The head-mounted display has a sensor system that detects a facing direction and a display positioned in the operator's field of view that displays an indicator of the facing direction. The head-mounted display also includes an interface element that allows the operator to select the facing direction. The control system operates such that the vessel control unit adjusts the rotational position of the rotatable device based on the facing direction.

U.S. Pat. No. 10,259,555 discloses a method for controlling movement of a marine vessel near an object, which includes accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 11,600,184 discloses a propulsion control system on a marine vessel includes at least one propulsion device configured to propel the marine vessel, at least one input device manipulatable to provide user control input to control propulsion of the marine vessel, at least one proximity sensor system configured to generate proximity measurements describing a proximity of an object with respect to the marine vessel, and a controller. The controller is configured to receive proximity measurements describing locations of one or more objects with respect to the marine vessel and receive a command vector based on the user input, wherein the command vector instructs a magnitude and direction for propulsion of the marine vessel with respect to a point of navigation. The controller is further configured to determine a funnel boundary based on the command vector and to identify an object within the funnel boundary based on the proximity measurements. Once an object is determined to be within the funnel boundary, a propulsion adjustment command is calculated based on the command vector and an angle of the object within the funnel boundary with respect to the point of navigation. The at least one propulsion device is then controlled based on the propulsion adjustment command.

U.S. patent application Ser. No. 18/302,602 discloses a system configured to assist a user in identifying an object in an area outside a marine vessel. An image sensor is configured to collect imaging data for the area outside the marine vessel. A display device is configured to generate a display on a windshield assembly. The windshield assembly comprises a windshield and a frame adjacent to at least one side of the windshield. A control system is configured to analyze the imaging data to identify an object within the area outside the marine vessel and to control the display device to generate a display to visually indicate the object on the windshield assembly, where the display assists the user positioned at a helm of the marine vessel in identifying the object through the windshield.

SUMMARY

In accordance with some embodiments of the disclosed subject matter, a system for placing a virtual object in an environment of a non-virtual marine vessel is provided, the system comprising: one or more hardware processors configured to: receive an instruction to add a virtual object to a model of the environment used to facilitate one or more autonomous operations of the non-virtual marine vessel; receive information indicative of an object position and object orientation at which to place the virtual object within the environment with respect to the marine vessel; and add data that represents the virtual object to the model, such that an autonomy system of the non-virtual marine vessel identifies the virtual object as a non-virtual object in the environment.

In some embodiments, the system further comprises: a plurality of cameras, including at least a first camera, wherein each of the plurality of cameras is configured to be mounted to the marine vessel with an associated field of view of an environment of the marine vessel, and wherein each of the plurality of cameras is associated with a three-dimensional camera coordinate system; wherein the one or more hardware processors are further configured to: determine three-dimensional location information associated with an object in the environment of the marine vessel in a three-dimensional global coordinate system based on a transform between the camera coordinate system associated with the first camera and the global coordinate system; and generate the model of the environment based on the three-dimensional location information associated with the object.

In some embodiments, each camera of the plurality of cameras comprises a stereoscopic camera.

In some embodiments, the one or more hardware processors are further configured to: receive virtual object data associated with the virtual object, wherein the virtual object data comprises information indicative of a shape of the virtual object; determine a position and orientation of the virtual object within the global coordinate system based on the information indicative of the object position and object orientation at which to place the virtual object; identify one or more positions in the global coordinate system occupied by the virtual object based on the object position and the object orientation at which to place the virtual object, and the virtual object data; and add points corresponding to the one or more positions in the global coordinate system to the model of the of the environment.

In some embodiments, the one or more hardware processors are further configured to: receive an image from the first camera, wherein the image includes a portion of the environment that corresponds to a portion of the model of the environment that includes at least a portion of the virtual object; receive segmentation information associated with the first camera, wherein the segmentation information includes classification information associated with features located in a field of view associated with the first camera, and classification information associated with the portion of the virtual object; and present, using a display device, a masked image based on the image and the segmentation information.

In some embodiments, the model of the environment comprises a point cloud comprising a plurality of points, each of the plurality of points corresponding to a location on a surface of an object in the environment.

In some embodiments, the model of the environment comprises an occupancy grid comprising a plurality of cells, wherein a value associated with each cell is indicative of a probability that the cell is occupied by an obstruction in the environment.

In some embodiments, the one or more hardware processors are further configured to: generate a two-dimensional image representing at least a portion of the model of the environment; and present, using a display device, the two-dimensional image representing at least a portion of the model of the environment.

In some embodiments, the one or more hardware processors are further configured to: receive, from the autonomy system, a version of the model of the environment; add the data that represents the virtual object to the version of the model based on the information indicative of the object position and object orientation at which to place the virtual object, thereby generating an updated model of the environment that includes the virtual object; and provide the updated model of the environment to the autonomy system, such that the autonomy system of the non-virtual marine vessel identifies the virtual object as a non-virtual object in the environment.

In some embodiments, the system further comprises: a plurality of cameras, including at least a first camera and a second camera, wherein each of the plurality of cameras is configured to be mounted to the marine vessel with an associated field of view of an environment of the marine vessel, and wherein each of the plurality of cameras is associated with a three-dimensional camera coordinate system; wherein the one or more hardware processors are further configured to: generate, using a real-time graphics engine, a digital twin of the non-virtual marine vessel, wherein the digital twin comprises a plurality of virtual cameras, including at least a first virtual camera and a second virtual camera, and wherein each of the plurality of virtual cameras is positioned with respect to the digital twin to have an associated field of view of a virtual environment of the digital twin of the marine vessel that corresponds to a field of view associated with one of the plurality of cameras; receive virtual object data associated with the virtual object, wherein the virtual object data comprises information indicative of a shape of the virtual object; place the virtual object in the virtual environment with a virtual object position and virtual object orientation corresponding the object position and object orientation, and based on the virtual object data; generate a model of the virtual environment based on three-dimensional location information associated with the virtual object; and generate the data that represents the virtual object based on the model of the virtual environment.

In some embodiments, the model of the virtual environment comprises a point cloud comprising a plurality of points, each of the plurality of points corresponding to a location of a portion of the virtual object in the virtual environment, and wherein the one or more hardware processors are further configured to: provide the plurality of points to the autonomy system, such that the autonomy system of the non-virtual marine vessel identifies the virtual object as a non-virtual object in the environment.

In some embodiments, the one or more hardware processors are further configured to: determine that the virtual object is at least partially within the field of view of the first virtual camera; render, using the real-time graphics engine, a two-dimensional image of the virtual environment from a point of view of the first virtual camera based on the virtual object data; receive image data from the first camera; generate a view of an extended reality (XR) scene based on the image data from the first camera and the two-dimensional image of the virtual environment, such that the virtual object appears to be present in the view of the XR scene at the object position and object orientation, wherein the XR scene includes a portion of the environment; and present, using a display device, the view of the XR scene.

In some embodiments, the one or more hardware processors are further configured to: render, using the real-time graphics engine, a two-dimensional image of the virtual environment from a virtual camera point of view, wherein the virtual camera point of view is associated with a location within the virtual environment and a viewing angle with respect to the virtual environment, and wherein the two-dimensional image of the virtual environment includes a representation of a portion of the virtual object; and present, using a display device, the two-dimensional image of the virtual environment.

In some embodiments, the one or more hardware processors are further configured to: render, using the real-time graphics engine, a second two-dimensional image of the virtual environment from a second virtual camera point of view, wherein the second virtual camera point of view is associated with a second location within the virtual environment and a second viewing angle with respect to the virtual environment, the second location is different than the location associated with the virtual camera point of view and the second viewing angle is different than the viewing angle associated with the virtual camera point of view, and wherein the second two-dimensional image of the virtual environment includes a second representation of the portion of the virtual object, and a representation of the digital twin; and present, using the display device, the second two-dimensional image of the virtual environment concurrently with presentation of the two-dimensional image of the virtual environment.

In some embodiments, the location and viewing angle associated with the virtual camera point of view is fixed with respect to the digital twin, such that the location and viewing angle changes as a position of the digital twin changes with respect to the virtual environment, and wherein the second location and the second viewing angle associated with the virtual camera point of view is fixed with respect to the virtual environment, such that a posture of the representation of the digital twin changes with respect to the second virtual camera point of view as a position of the digital twin changes with respect to the virtual environment.

In some embodiments, the one or more hardware processors are further configured to: receive information indicative of movement of the non-virtual marine vessel in the environment; update a position of the digital twin in the virtual environment based on the information indicative of movement of the non-virtual marine vessel in the environment;

and render, using the real-time graphics engine, a third two-dimensional image of the virtual environment from the virtual camera point of view based on the updated position of the digital twin in the virtual environment; and present, using the display device, the third two-dimensional image of the virtual environment.

In some embodiments, the one or more hardware processors are further configured to: render, using the real-time graphics engine, a stream of two-dimensional images of the virtual environment from a virtual camera point of view as a position of the digital twin in the virtual environment is updated based on information indicative of movements of the non-virtual marine vessel in the environment, wherein the virtual camera point of view is associated with a location within the virtual environment and a viewing angle with respect to the virtual environment, and wherein the two-dimensional image of the virtual environment includes a representation of a portion of the virtual object; and store the stream of the two-dimensional image of virtual environment the two-dimensional image of the virtual environment in non-volatile memory, such that evaluation of the one or more autonomous operations of the non-virtual marine vessel with respect to the virtual object is facilitated.

In some embodiments, the one or more hardware processors are further configured to: simultaneously present, using a display device, a two-dimensional image representing at least a portion of the model of the environment, a two-dimensional image of the virtual environment, and a masked image based on an image of the environment.

In accordance with some embodiments of the disclosed subject matter, a method for placing a virtual object in an environment of a non-virtual marine vessel, the method comprising: receiving an instruction to add a virtual object to a model of the environment used to facilitate one or more autonomous operations of the non-virtual marine vessel; receiving information indicative of an object position and object orientation at which to place the virtual object within the environment with respect to the marine vessel; and adding data that represents the virtual object to the model, such that an autonomy system of the non-virtual marine vessel identifies the virtual object as a non-virtual object in the environment.

BRIEF DESCRIPTION OF THE DRAWINGS

The present disclosure is described with reference to the following drawings.

FIG. 4 shows an example of a process for facilitating autonomous operation of a non-virtual marine vessel in an extended reality environment that includes a virtual object in accordance with some embodiments of the disclosure.

FIG. 5 shows an example of a process for incorporating a virtual object(s) into a model of a non-virtual environment of the non-virtual marine vessel in accordance with some embodiments of the disclosure.

FIG. 6 shows another example of a process for incorporating a virtual object(s) into a model of a non-virtual environment of the non-virtual marine vessel in accordance with some embodiments of the disclosure.

DETAILED DESCRIPTION

To validate an autonomy system of a marine vessel in a variety of conditions and scenarios, the scenario currently needs to be physically recreated in the real world. This can be especially difficult if the scenario includes other boats, different types of docks, etc. This type of validation requires large investments of time and money. Due to such costs, these types of validations are often carried out entirely within software simulations in which an instance of the autonomy system is provided with inputs generated within a simulation corresponding to the scenario, and the behavior of the autonomy system can be evaluated based on outputs provided by the autonomy system to attempt to verify and validate that the autonomy system behaves within expectations. However, such simulation techniques have different drawbacks. For example, in a software simulation, models of different systems of the vessel are used to provide the inputs that are provided to the autonomy system, and the resulting simulation is only as good as the models. In such an example, to provide accurate results, conventional software tools for validation and verification of autonomy systems that are available require vessel models that capture the physical behavior of the vessel as accurately as possible, but such models currently cannot accurately capture all of the behaviors of a vessel, and must be adjusted for each different vessel for which the autonomy system is to be verified and/or validated. In contrast, physical on-water testing does not require any vessel models, but requires a lot of time and costs in re-creating a scenario.

In some embodiments, mechanisms described herein can facilitate evaluation of an autonomy system of a marine vessel of a real vessel using a simulated environment. For example, mechanisms described herein can relatively easily (e.g., quickly and at low cost) simulate many different scenarios, and can utilize a real vessel with the autonomy system to be tested, which can be relied on to react accurately (e.g., unlike an imperfect model of the vessel), and which can be physically experienced by a person as the autonomy system reacts to the scenario being simulated.

Figure 1:
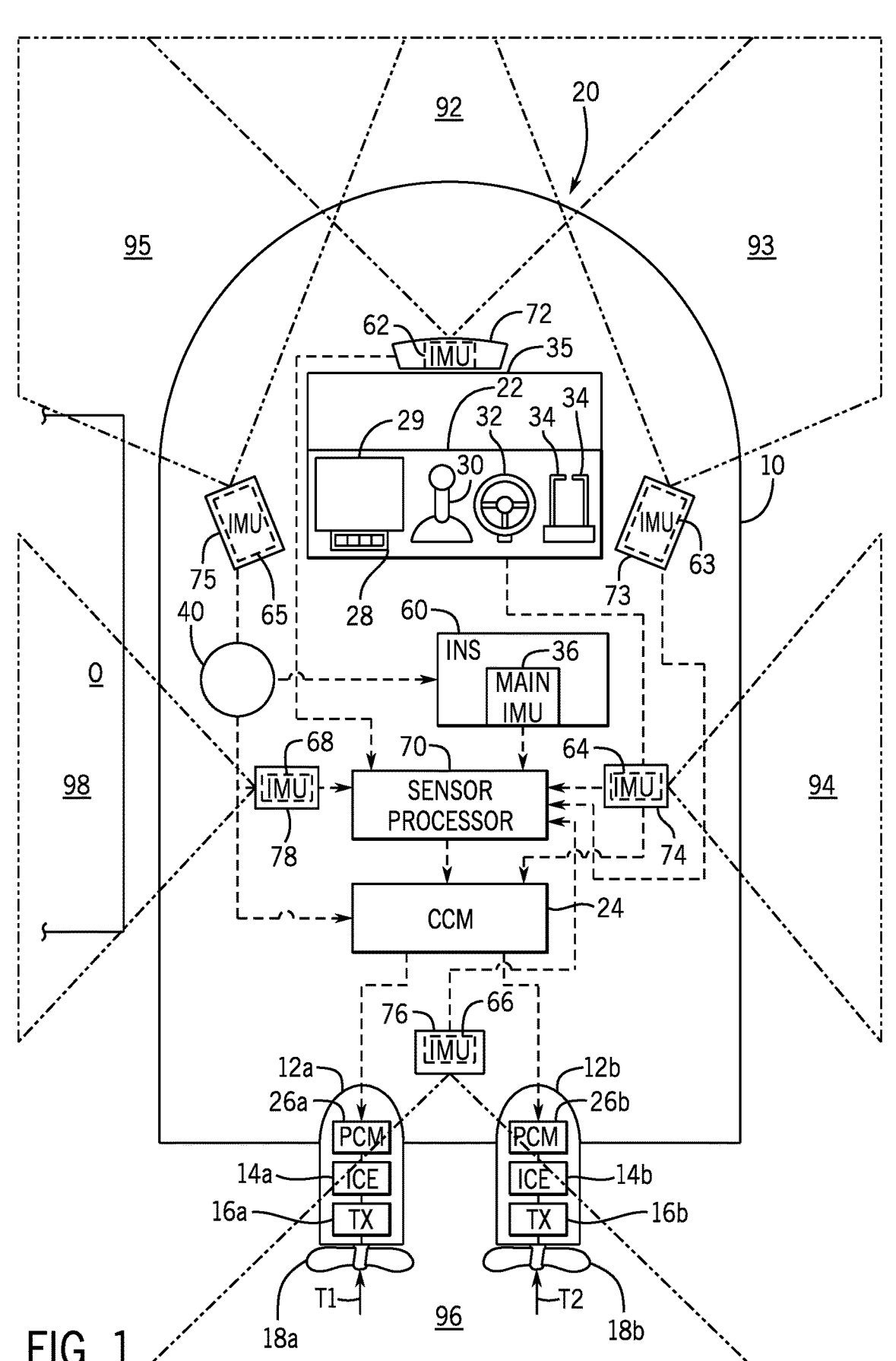
FIG. 1 shows an example of a propulsion system on a marine vessel in accordance with some embodiments of the disclosure.

FIG. 1 shows an example of a schematic representation of a propulsion system on a marine vessel in accordance with some embodiments of the disclosed subject matter. FIG. 1 shows a marine vessel 10 equipped with a propulsion system 20 on marine vessel 10 configured in accordance with some embodiments of the disclosed subject matter. In some embodiments, propulsion system 20 can be configured to operate, for example, in a joysticking mode in which a joystick is operated by a user to control vessel movement within an x/y plane, among other modes (e.g., as described hereinbelow). In some embodiments, propulsion system 20 can include first and second propulsion devices 12a, 12b that produce first and second thrusts T1, T2 to propel the vessel 10. First and second propulsion devices 12a, 12b are illustrated as outboard motors, but can alternatively be inboard motors, stern drives, jet drives, pod drives, any other suitable propulsion device, or combinations thereof. Each propulsion device can be provided with an engine 14a, 14b operatively connected to a transmission 16a, 16b, in turn, operatively connected to a propeller 18a, 18b.

In some embodiments, vessel 10 can also house various control elements that comprise part of the marine propulsion system 20. For example, marine propulsion system 20 can comprise an operation console 22 in signal communication, for example via a controller area network (CAN) bus, with a controller 24, such as for example a command control module (CCM), and with propulsion control modules (PCM) 26a, 26b associated with the respective propulsion devices 12a, 12b. Each of controller 24 and PCMs 26a, 26b can include memory and a programmable processor. Each control module 24, 26a, 26b can include one or more processors communicatively connected to a respective storage system comprising a computer-readable medium that includes volatile and/or nonvolatile memory upon which computer-readable code and data can be stored. Additionally or alternatively, in some embodiments, a processor(s) of one or more of control modules 24, 26a, 26b can be communicatively connected to a shared storage system comprising a computer-readable medium that includes volatile and/or nonvolatile memory upon which computer-readable code and data can be stored.

Note that although mechanisms described herein are generally described in connection with an internal combustion engine (ICE) propulsion system that includes a powerhead implemented using an ICE engine, mechanisms described herein can be used in connection with a propulsion system that includes any other suitable powerhead, such as one or more electric motors, or any suitable combination of powerheads. For example, propulsion devices 12a, 12b can be replaced by, or used in combination with, one or more propulsion devices that produce thrust to propel vessel 10 using an electric motor, such as an electric outboard motor, electric inboard motor, electric stern drive, electric jet drive, electric pod drive, any other suitable propulsion device, or combinations thereof, that is implemented using an electric motor (e.g., which can be implemented as a motor that is directly connected to a propulsor shaft without a transmission, such as transmission 16a, 16b).

In some embodiments, operation console 22 can include any suitable number of user input devices, such as, a keypad 28, a joystick 30, a steering wheel 32, one or more throttle/ shift levers 34, etc., and any suitable number of output devices, such as a display 29, a heads-up display (HUD) 35, one or more speakers (not shown), etc. In some embodiments, each of the input devices can be configured to input commands to controller 24, which can, in turn, communicate control instructions to first and second propulsion devices 12a, 12b by communicating with the PCMs 26a, 26b. In some embodiments, steering wheel 32 and throttle/shift lever(s) 34 can function in a conventional manner, such that rotation of steering wheel 32, for example, activates a transducer that provides a signal to controller 24 regarding a desired direction of the vessel 10. Controller 24 can, in turn, send signals to PCMs 26a, 26b (and/or thrust vector module(s) (TVMs), or additional modules if provided), which in turn can activate steering actuators to achieve desired orientations of the propulsion devices 12a, 12b. In some embodiments, propulsion devices 12a, 12b can be independently steerable about a respective steering axis. Throttle/shift lever(s) 34 can send signals to controller 24 regarding the desired gear (e.g., forward, reverse, or neutral) of transmissions 16a, 16b and desired rotational speed of engines 14a, 14b of propulsion devices 12a, 12b. Controller 24 can, in turn, send signals to PCMs 26a, 26b, which in turn activate electromechanical actuators in transmissions 16a, 16b and engines 14a, 14b for shift and throttle, respectively. A manually operable input device, such as joystick 30, can also be used to provide signals to controller 24. In some embodiments, joystick 30 can be used to allow an operator of vessel 10 to manually maneuver vessel 10, such as to achieve lateral translation or rotation of vessel 10.

In some embodiments, output devices, such as display 29, HUD 35, speakers, etc., can be configured to present (e.g., visually, audibly, etc.) any suitable data, information, image data (e.g., images captured by one or more devices that include an image sensor(s)), received from controller 24, from another controller or processor, and/or generated based on data and/or information received from controller 24, another controller, and/or processor. In some embodiments, display 29 can be any suitable display, such as a multi-function display (MFD). In some embodiments, display 29 can be used to present a user interface, which can be implemented as a touchscreen or display that is capable of receiving input via a touchscreen. In some embodiments, one or more other input devices can be used to interact with a user interface (e.g., a graphical user interface) presented by display 29, such as a keypad (e.g., keypad 28), a keyboard, a track ball, a track pad, any other suitable user input device, and/or suitable combination of user input devices. In some embodiments, vessel 10 can include multiple displays 29, which can be integrated into operation console 22, integrated into another portion of vessel 10, and/or mechanically mounted to operation console 22 or another portion of vessel 10. In some embodiments, display 29 can be used to present menus, operational data (e.g., throttle, speed, heading, engine output, etc.), maps, charts, settings that can be used to configure another display (e.g., HUD 35), etc.

In some embodiments, HUD 35 can be any suitable display device which can present both a user interface (e.g., on a side of HUD facing toward operation console) and a view of an environment that could be seen if the HUD was not there. For example, HUD 35 can be implemented to project information onto a windshield of vessel 10, through which a portion of an environment of vessel 10 can be observed (and/or portions of vessel 10 itself). As another example, HUD 35 can be integrated into a windshield of vessel 10 (e.g., using a transparent display technology, such as organic light emitting diode (OLED) technology) through which a portion of an environment of vessel 10 can be observed (and/or portions of vessel 10 itself), and which can be used to present a user interface. In some embodiments, HUD 35 can be implemented using a techniques presently known in the art, such as those used in aircraft. In some embodiments, display 29 and/or HUD 35 can be omitted. For example, vessel 10 can include only MFDs (e.g., display 29) or only a HUD (e.g., HUD 35), or both can be omitted (e.g., where a mobile device, such as a tablet computer, laptop computer, head-mounted display, etc. is configured to present a user interface of vessel 10).

In some embodiments, propulsion system 20 can also include one or more depth sensors 72, 73, 74, 75, 76, and 78. In some embodiments, depth sensors 72-78 can form a portion of a vision system associated with vessel 10 (although the vision system may be configured to use sensing modes other than visible light, such as sound-based sensing, radio-based sensing, infrared-based sensing, etc.). Although a limited number of depth sensors are shown (e.g., one perpendicular to each of the bow, stern, and port and starboard sides the vessel 10, and two positioned at an angle between the bow and sides), fewer or more sensors can be provided at each location and/or provided at other locations, such as on a hardtop of the vessel 10. In some embodiments, depth sensors 72-78 can be used to determine a three-dimensional location of an object and/or other feature of an environment (e.g., a water surface) that is within a field of view of the depth sensor (e.g., partial FOVs 92, 93, 94, 95, 96, and 98 shown in FIG. 1, associated with depth sensors 72, 73, 74, 75, 76, and 78 respectively) with respect to the location of the depth sensor (e.g., distance to various points on an object and a direction associated with each of the various points). For example, depth sensors 72-78 can be implemented using one or more of depth cameras (e.g., implemented using stereoscopic imaging techniques, structured light imaging techniques, continuous-wave time-of-flight imaging techniques, direct time-of-flight imaging techniques, etc.), three-dimensional laser range finders (e.g., implemented using light detection and ranging (lidar) techniques), radars, sonars, and/or other devices individually capable of determining both the distance and direction to points on an object and/or other feature relatively accurately (e.g., on the order of several to tens of centimeters (cm) at relatively close ranges on the order of several to tens of meters, such as an accuracy of about +/−3 cm at 5 meters (m) and +/−13 cm at 10 m for stereoscopic cameras), e.g., the relative position of various points on an object O (such as a dock, a seawall, a slip, another vessel, a person, a portion of a bridge, a portion of a dam, a relatively large rock, a tree, etc.) with respect to each sensor 72-78 having a field of view that includes object O. In some embodiments, a 3D location of object O and/or various points on object O with respect to vessel 10 can be determined (e.g., by a sensor processor 70) using the location of object O and/or various points on object O determined by one or more of depth sensors 72-78. Additionally, in some embodiments, a 3D location of points of vessel 10 that fall within a sensor FOV can be determined (e.g., by sensor processor 70) using the location of points on vessel 10 determined by one or more of depth sensors 72-78. In some embodiments, a calibration process can be performed to determine a set of transforms that can be used to convert a location from a local coordinate system used by a particular depth sensor (sometimes referred to herein as a camera coordinate system, although it can be a coordinate system used by another type of depth sensor, such as a lidar or sonar-based sensor) to the corresponding location in a global coordinate system used by vessel 10 (e.g., used to perform autonomous navigation processes, such as automatically guiding vessel 10 during docking, automatically guiding vessel 10 during trailer loading or unloading, automatically avoiding collisions with objects via a virtual bumper or buffer zone, autonomous navigation through areas that include other vessels and/or other obstacles, etc.). The camera coordinate system can define a local reference frame for a particular camera (or other type of depth sensor), and the global coordinate system can define a reference frame to which each camera (or other type of depth sensor) is calibrated, which can be referred to as a common reference frame, a global reference frame, or a world reference frame (note that the global coordinate system can be independent and distinct from the geographical coordinate system of latitude and longitude often used to designate locations on Earth).

In some embodiments, a camera coordinate system can be defined relative to a center of an imaging plane (e.g., with an origin at a center of the imaging plane, a depth axis extending perpendicular to the imaging plane, and lateral axes extending perpendicular to the depth axis) of the camera. In some embodiments, the camera coordinate system can use any suitable type of coordinate system, such as a 3D Cartesian coordinate system, a spherical coordinate system, a cylindrical coordinate system, etc. Note that the type of coordinate system used to define the camera coordinate system can vary based on the type of sensor being used. For example, depth cameras can use a Cartesian coordinate system that defines a depth axis (e.g., a z-axis) that extends perpendicular to the imaging plane of the camera (e.g., an imaging plane associated with an image sensor of the camera), and lateral coordinates (e.g., an x-axis and a y-axis) that extend parallel to the imaging plane and can be used to define the horizontal and vertical distance of a point from an optical axis of the camera. As another example, a scanning lidar that sweeps across a scene using a laser line or single laser point can use a cylindrical coordinate system that defines a depth axis (e.g., an r-axis) that extends perpendicular to the light detector(s) (e.g., an imaging plane associated with an area sensor, an imaging axis of a line sensor), and lateral coordinates (e.g., a z-axis and a O coordinate) that can be used to define the angular distance (e.g., in degrees or radians) and vertical distance of a point from reference axes of the lidar system.

In some embodiments, a global coordinate system (sometimes referred to as global coordinates or world coordinates) can be defined relative to a particular point on vessel 10. For example, a coordinate system of a particular depth sensor can be used as the basis for the global coordinate system (e.g., a front-facing camera, such as depth sensor 72), and locations of points in an environment of vessel 10 can be defined based on the distance from an origin of that camera coordinate system. In such an example, an offset can be used to determine a location of a particular point on the vessel (e.g., a point of navigation, such as center of gravity (COG) or center of rotation (COR) of vessel 10). As another example, locations of points in an environment of vessel 10 can be defined based on the distance from a COG or COR of vessel 10. In some embodiments, the global coordinate system can use any suitable type of coordinate system, such as a 3D Cartesian coordinate system, a spherical coordinate system, a cylindrical coordinate system, etc.

In some embodiments, sensors 72-78 can determine and/or provide information regarding a location of an object in camera coordinates and using any suitable format (e.g., providing information using a depth image(s) such as an RGBD image, or using a point cloud in any suitable file format). Additionally or alternatively, in some embodiments, sensors 72-78 can determine and/or provide information regarding a location of an object in global coordinates (e.g., using a transform between camera coordinates and global coordinates identified during a calibration procedure) and using any suitable format (e.g., providing information using a depth image(s) such as an RGBD image, or using a point cloud in any suitable file format). In some embodiments, sensors 72-78 can provide position information for various points within that sensors FOV to one or more controllers, such as to sensor processor 70 and/or controller 24 via any suitable communication network, such as by way of a dedicated bus connecting the sensors to a controller, a CAN bus, or wireless network link(s), as described below. In some embodiments, given the large amount of proximity data produced by depth sensors 72-78, the connection between sensors 72-78 and sensor processor 70 can be via a dedicated bus or network connection. Such a dedicated bus or network connection can be separate from the vessel network (e.g., including a CAN bus) in order to facilitate transmission of a large amount of depth measurement data (and, in some embodiments, IMU data) to sensor processor 70. Such massive data transmission may not be possible on a typical vessel network, such as a CAN bus or wireless network being used for communication by multiple devices. In some embodiments, sensor processor 70 can be configured to communicate filtered data on the vessel network, such as a CAN bus or wireless network. Additionally or alternatively, a dedicated communication link can be provided between sensor processor 70 and a propulsion controller, such as central controller 24.

In some embodiments, depth sensors 72-78 can include different types of sensors (e.g., depending on the distance between vessel 10 and an object, such as object O). For example, radar sensors can be used to detect objects at further distances, and cameras, ultrasonic sensors, and/or lidar can be used for objects at closer distances. Note that depth camera sensors can be used, alone or in combination with any of the sensors described above, for example, to provide object location information to controller 24. Sensors 72-78 can be placed at positions on vessel 10 so that the sensor is at a height and facing a direction suitable to detect objects that vessel 10 is likely to encounter. Additionally, sensors 72-78 (and/or additional sensors) can be placed to have at least partially overlapping fields of view (e.g., as shown in FIG. 1). Note that optimal sensor positions can vary depending on vessel size and configuration.

In FIG. 1, the depth sensors shown are positioned to observe multiple regions around vessel 10, including the front, sides, and stern of vessel 10, and include a front-facing sensor 72, a front-starboard-facing sensor 73, a starboard-facing sensor 74, a front-port-facing sensor 73, a rear-facing sensor 76, a port-facing sensor 78. In some embodiments, one or more depth sensors can be placed on a hard top of marine vessel 10 and arranged such that the fields of view of the one or more depth sensors, combined, cover the entire 360° area surrounding vessel 10 (although there may be blind spots relatively close to vessel 10, such as where the hull obstructs the field of view). Note also that the relevant controller, such as sensor processor 70, can selectively operate any one or more of various different sensors (e.g., including depth cameras, radars, lidars, ultrasonics, or any other suitable sensor technology) to sense the location of objects in an environment of vessel 10.

In some embodiments, sensor processor 70 can integrate sensor data provided from one or more types of sensor into one or more models of an environment of vessel 10, objects within the environment, and/or vessel 10 itself. In such embodiments, the model(s) can be in any suitable format, such as one or more point clouds, one or more maps, one or more occupancy grids, and/or one or more data structures including a list of surrounding objects (e.g., including the object's size and position), integrating location information from multiple sensors. As described above, the location data from different sensors can be translated into a common reference frame (e.g., defined by the global coordinate system).

Autonomous and/or advanced operator assistance (sometimes referred to as semi-autonomous) controls for improved vessel handling qualities generally requires a relatively accurate ability to identify objects in an environment of vessel 10, often using multiple depth sensors mounted on vessel 10. In general, such depth sensors can be positioned to detect the objects in the marine environment surrounding marine vessel 10, such as a dock, a swimmer, or other obstruction in the current path and/or other potential paths of vessel 10. Each sensor can provide location information of features within its field of view relative to its own frame of reference (e.g., in the camera coordinate system associated with that sensor) and/or in a common frame of reference (e.g., in the global coordinate system). For example, the location information can be transformed from the respective camera coordinates at the camera and/or at a controller (e.g., sensor processor 70) using one or more transforms derived during a calibration procedure. Depending on the type of sensor(s), the application of use, boat size, hull shape, etc., multiple sensor types and sensor locations may be required to provide adequate sensing around the marine vessel for operation in all marine environments. To create a cohesive dataset that can be used for purposes of vessel control and vessel navigation, including autonomous vessel navigation and automatic maneuver-limiting control (e.g., velocity limiting for object avoidance, maintenance of a buffer zone, etc.), information from multiple sources (e.g., multiple depth sensors, multiple types of depth sensors, proximity sensors, etc.), can be translated to a common reference frame. To accurately translate the information to the common reference frame typically requires precise knowledge of the posture (e.g., including 3D location, installation attitude, and/or orientation) of each sensor relative to the common reference frame such that the information received from each sensor can be translated appropriately. Regardless of what type of model(s) is being generated, the relevant sensor installation posture of each sensor on the marine vessel must be known so that the location information from each respective sensor can be properly interpreted for navigation purposes. Note that the installation posture of each sensor can be calculated or otherwise determined explicitly, however, such information is generally difficult to determine with sufficient accuracy. Alternatively, the installation posture of each sensor can be implicit in the transforms determined during a calibration procedure (e.g., transforms that are optimized using machine learning techniques may not require explicit knowledge of the location of the sensors). In some embodiments, a calibration procedure can begin with an initial estimate of camera poses (e.g., based on measurement and/or a CAD model), and the calibration procedure can include refining the initial estimate (e.g., via an optimization algorithm).

In some embodiments, vessel 10 can have a main inertial measurement unit (IMU) installed at a known location on the marine vessel. Referencing the example in FIG. 1, main IMU 36 can be part of an inertial navigation system (INS) such as including one or more micro-electro-mechanical systems (MEMS). For example, INS 60 can include a MEMS angular rate sensor, such as a rate gyro, a MEMS accelerometer, and a magnetometer. Such INS systems are well known in the relevant art. Additionally or alternatively, in some embodiments, motion and angular position (including pitch, roll, and yaw) can be sensed by a differently configured INS 60, or by an attitude heading reference system (AHRS) that provides 3D orientation of vessel 10 by integrating gyroscopic measurements, accelerometer data, and magnetometer data. In some embodiments, INS 60 can receive orientation information from main IMU 36 and can also receive information from a GPS receiver 40 comprising part of a satellite-based radio navigation system (e.g., a global navigation satellite system (GNSS)), such as the global positioning system (GPS). GPS receiver 40 can be located at a pre-selected fixed position on vessel 10, which provides information related to a position of vessel 10 with respect to a planetary frame of reference (e.g., latitude, longitude, and height with respect to sea level). In some embodiments, main IMU 36 can also be located at a known and fixed position with respect to the center of rotation (COR) and/or center of gravity (COG) of vessel 10 (e.g., a COG when the vessel is empty).

In some embodiments, IMU data from each sensor IMU 62-68 and/or main IMU 36 can be provided to sensor processor 70 and/or to another controller (e.g., CCM 24, INS 60, etc.). For example, the IMU data from each sensor IMU 62-68 can be transmitted along with the feature location information from the respective depth sensor 72-78. Additionally or alternatively, in some embodiments, each sensor IMU 62-68 can have an integrated microprocessor configured to process the respective sensor IMU data. In some embodiments, as shown in FIG. 1, depth data and/or IMU data can be communicated to sensor processor 70 (and/or any other suitable controller), which can be via any suitable wired or wireless communication technique(s), such as via a dedicated communication bus, wireless transmission protocols (e.g. Bluetooth, Bluetooth Low Energy, ZigBee, etc.), a CAN bus comprising part of the vessel network, etc. Note that the dashed connection lines in FIG. 1 are meant to show only that the various control elements are capable of communicating with one another, and do not necessarily represent actual wiring connections between the control elements, nor do they represent the only paths of communication between the elements.

In some embodiments, some sensor processing functions can be performed by a separate computing device. For example, sensor processor 70 can communicate processed sensor data to central controller 24, which can utilize the processed data for navigation functions and/or other vessel control functions. As described below, in some embodiments, sensor processor 70 can be associated with its own storage system comprising memory and its own processing system that executes programs and accesses data stored in the memory of sensor processor 70. Additionally or alternatively, in some embodiments, one or more functions described as being performed by sensor processor 70 can be incorporated in a multi-purpose controller, such as sensor processor software stored and executed within controller 24. For example, in some embodiments, controller 24 can control marine vessel navigation, such as autonomous point-to-point navigation, automatic docking, or other advanced operator assistance programs. In some embodiments, controller 24 can also perform one or more sensor processing functions. Additionally or alternatively, in some embodiments, functions described herein as comprising part of the sensor processor functions can be distributed across two or more processing devices. For example, each depth sensor 72-78 can include one or more processors that are configured to perform certain functions (e.g., segmenting image data to classify one or more objects in the image, generate one or more RGBD images, generate one or more 3D depth maps, generate a point cloud corresponding to the 3D depth map, project points into a global coordinate system). As another example, each IMU 62-68 can include (or otherwise be associated with) one or more processors that are configured to perform calculations to interpret measured IMU data (such as to determine an attitude estimate for the respective IMU) and provide the interpreted IMU data to one or more other processing devices or controllers for execution of subsequent processing steps.

In some embodiments, a controller(s) (e.g., controller 24, sensor processor 70, etc.) can use any suitable information about the environment when planning a path for autonomous and/or semi-autonomous navigation. For example, the controller(s) can use an occupancy grid that has been generated and/or updated using proximity information measured by proximity sensors (e.g., proximity sensors 72-78). In some embodiments, the occupancy grid can be formatted as a data structure in which each element corresponds to a cell of the occupancy grid, and each element is indicative of a probability that the cell is occupied by an object/obstacle. In some embodiments, each cell can represent a volume of the environment (e.g., having a width, depth, and height). For example, each cell can represent a volume that is 0.25 meters (m) by 0.25 m laterally, and extends from a water surface to a height at or above the top of vessel 10 (e.g., 3 m from the water's surface, 5 m from the water surface, etc.). In some embodiments, vessel 10 can gather location information corresponding to objects in the environment during operation (e.g., using proximity sensors 72-78), and can generate a model (e.g., using a point cloud) of objects in an environment around vessel 10 based on the location of the objects. The model of the objects in the environment can be used to identify cells in the occupancy grid that are more likely to contain an obstruction, and those that are less likely. For example, the model of the environment can be integrated over the volume of space represented by any particular occupancy grid cell, and can determine whether an object is located in that cell based on whether the model indicates the presence of an one or more objects within the volume (e.g., based on the number of point cloud points within the volume, based on the number of point cloud points within the volume excluding points corresponding to water, etc.).

In some embodiments, the controller(s) can update the occupancy grid in real-time based on recent measurements of a portion of the environment within a predetermined range of the proximity sensors(s). Portions of the occupancy grid that are out of that range can be maintained in memory (e.g., for use in planning a path through the portion of the environment represented by that portion of the occupancy grid in the future). In some embodiments, cells in the occupancy grid can be associated with local coordinates (e.g., based on the global coordinate system), and can be associated with a geographic coordinate system (e.g., latitude and longitude). In such an example, the local coordinates can be defined based on linear measurements indicating placement of the cell (e.g., distance from an origin along two or more axes) and/or radial measurements (e.g., radial distance from one or more axes). A transform can define a relationship between the local coordinates and the associated geographic coordinates. In some embodiments, when planning a path, the controller(s) can use the occupancy grid to identify portions of the environment that can be safely traversed and those that may result in a collision.

In some embodiments, an occupancy grid can include multiple layers (e.g., each cell can be associated with multiple elements) that indicate a probability that the cell is occupied by a particular type of object. For example, each cell can be associated with an element indicative of a probability of any object being present in the cell. As another example, each cell can be associated with an element indicative of a probability of a person being present in the cell. As yet another example, each cell can be associated with an element indicative of a probability of a powered boat being present in the cell. As yet another example, each cell can be associated with an element indicative of a probability of a human-powered vessel (e.g., a kayak, a canoe, a row boat, a paddle boat, a stand-up paddle board, etc.) being present in the cell. As yet another example, each cell can be associated with an element indicative of a probability of a small vessel (e.g., a boat or other powered vessel, such as a jet ski, under a particular size) being present in the cell. As still another example, each cell can be associated with elements indicative of a probability of other types of objects and/or obstructions being present in the cell, such as land, a dock, a structure (e.g., a bridge, a pier, a post, a piling, etc.), vegetation, floating vegetation, miscellaneous debris, floating logs, etc.

In some embodiments, information indicating a probability of an object occupying a cell can be based on any suitable information. For example, location information (e.g., based on measurements by proximity sensors 72-78) can be correlated with feature label information that identifies a classification of a feature. In some embodiments, the label information can be generated using any suitable technique or combination of techniques. For example, one or more images of an environment (e.g., color images) can be captured, and can be used to generate segmentation information (e.g., using a trained machine learning model), which can include classification information that indicates which of a set of classes different portions of the image are most likely to correspond. In some embodiments, the set of classes can include classes that are relatively likely for the vessel to encounter (e.g., in a marine environment). As another example, one or more images of an environment can be captured, and can be used to generate object detection information (e.g., using a trained machine learning model), which can include classification information that indicates which of a set of classes particular portions of the image are most likely to correspond (e.g., instances of a particular class of the set of classes). In some embodiments, classification information associated with objects in the environment can be associated with portions of a model used to represent the environment. For example, points in a point cloud can be assigned a label based on a classification of an object at that position. Additionally, in some embodiments, the classification information can include a confidence that the label is accurate (e.g., a probability of the portion of the image being an instance of the class corresponding to the label). In some embodiments, such a label can be used to determine a likelihood that a particular type of object is located at different points in the environment. For example, if a volume of the environment corresponding to a particular cell of an occupancy grid includes points labeled as person, a layer of the occupancy grid corresponding to people can include an element corresponding to a likelihood that a person is present in that portion of the environment based on the label. As another example, if a volume of the environment corresponding to a particular cell of an occupancy grid includes points labeled as human-powered vessel (or some more particular class that is an instance of a human-powered vessel, such as kayak or canoe), a layer of the occupancy grid corresponding to human-powered vessels can include an element corresponding to a likelihood that a human-powered vessel is present in that portion of the environment based on the label.

In some embodiments, as vessel 10 traverses a path (e.g., a path planned by the controller(s), a current path set by an operator, etc.), the controller(s) can periodically (e.g., at regular and/or irregular intervals) project a model of vessel 10 forward along the path a predetermined distance to determine whether vessel 10 is likely to collide with any obstacles that may have obstructed the planned path (and/or that a proximity sensor(s) may have detected the presence of) since the path was planned. For example, at a predetermined rate (e.g., once per second, twice per second, etc.), the controller(s) can determine whether a cell of the occupancy grid which vessel 10 (e.g., including a buffer area) is predicted to traverse is occupied. If the controller(s) determines that a cell of the occupancy grid that vessel 10 is predicted to traverse is occupied, the controller(s) can initiate replanning of a route that avoids that cell and/or can control propulsion of vessel 10 to avoid colliding with the object (e.g., by slowing down, stopping, reversing, etc.).

In some embodiments, each processor (e.g., a processor of one or more of control modules 24, 26a, 26b) can access computer-readable code and, upon executing the code, carry out one or more functions, such as proximity measurement functions, autonomous navigation functions, environmental modeling functions, extended reality (XR) environment generation functions, XR scene presentation functions, etc., as described in detail below. In some embodiments, sensor processor 70 can be a dedicated, special-purpose computing system configured to process depth data and/or IMU data from depth sensors (e.g., depth sensors 72-78), sensor IMUs (e.g., IMUs 62-68, and/or main IMU 36), and/or generate image data (e.g., which can be used to present a portion of an XR scene).

In some embodiments, mechanisms described herein can be configured to use information from one or more of depth sensor 72-78 to generate an extended reality (e.g., augmented reality, mixed reality, or virtual reality) environment that includes a virtual object(s) and real objects that can be used to experience and/or validate how an autonomy system of a marine vessel behaves in particular situations (e.g., situations that are difficult and/or time consuming to implement entirely with real objects). For example, as described below in connection with FIGS. 4-9, a virtual object(s) at particular location(s) and/or that has particular characteristics can be incorporated into a model of the environment (e.g., a model of an XR environment that includes real and virtual objects) at low cost. In such an example, mechanisms described herein can be used to evaluate whether an autonomy system behaves as expected in many different scenarios at relatively low cost and/or during a relatively short period of time. Setting up a scenario with real objects in a marine environment can be time consuming and expensive (e.g., requiring the labor of many technicians and/or engineers, various physical objects, etc.), and can be hazardous to the vessel being tested and/or an operator/occupant of the vessel (e.g., if an autonomy system does not behave as expected, a vessel being tested can collide with a real object in the environment).

As another example, as described below in connection with FIGS. 4-9, a virtual object(s) at particular location(s) and/or that has particular characteristics can be incorporated into a model of the environment (e.g., a model of an XR environment that includes real and virtual objects) at low cost, and an operator and/or occupant can experience how an autonomy system of a vessel behaves in different scenarios, which can facilitate demonstration of the capabilities of the autonomy system without incurring expenses related to physically building various physical environments suitable to demonstrate the capabilities of the autonomy system.

In some embodiments, mechanisms described herein can be configured to use information from one or more of depth sensor 72-78 to present an extended reality (e.g., augmented reality, mixed reality, or virtual reality) scene that includes a virtual object in the extended reality environment that an operator and/or occupant of vessel 10 can view for evaluation of the autonomy system, training, recreation, etc. For example, as described below in connection with FIGS. 4 to 10A, a virtual object can be rendered and overlayed on an image(s) captured by a depth sensor (e.g., one or more of depth sensor 72-78), which can be presented as an extended reality (XR) scene using display 29. In such an example, a position and orientation of the virtual object with respect to vessel 10 can be used to determine a position, orientation, size, and view at which to present the virtual object in the XR scene is presented within the image data (e.g., based on a transform between the global coordinate system and the camera coordinate system).

As another example, as described below in connection with FIGS. 4 to 9, and 10B, a virtual object can be rendered by, and presented using, a mobile extended reality device (e.g., a smartphone, a tablet computer, a head-mounted display (HMD) with a transparent display or a non-transparent display, etc.) overlayed on a view of the XR environment (e.g., a view observed through a transparent display, or a view included in image data captured by a camera(s) of the mobile extended reality device) as part of an XR scene. In such an example, a position and orientation of the virtual object in the XR scene with respect to vessel 10 can be determined based on a position of vessel 10 (e.g., one or more anchor points on vessel 10) and/or a position of one or more anchor points in an environment of vessel 10 (e.g., a static point(s) in the environment).

As yet another example, as described below in connection with FIGS. 4-9, and 10C, a virtual object can be rendered and overlayed on a view of the environment (e.g., a view observed through a transparent HUD, or a view included in image data captured by a camera(s) of vessel 10 configured to capture image data used to present a HUD-like display using a non-transparent display device) as part of an XR scene presented by a HUD (e.g., HUD 35). In such an example, a position and orientation of the virtual object in the XR scene with respect to vessel 10 can be determined based on a position of vessel 10 and a perspective from which the XR scene is being viewed by a user.

In some embodiments, sensor processor 70 (and/or any other suitable processor(s)) can be programmed and/or otherwise configured to automatically perform an XR environment generation process, in which sensor processor 70 (and/or any other suitable processor(s)) can cause a virtual object(s) to be incorporated into an environmental model used by an autonomy system based on the position and orientation of the virtual object, and cause the autonomy system of the marine vessel to treat the virtual object(s) as a part of the real environment of marine vessel 10. For example, as described below in connection with FIGS. 4-8, sensor processor 70 (and/or any other suitable processor(s)) can generate 2D and/or 3D data corresponding to a virtual object(s) based on the location and orientation of the virtual object (e.g., with respect to vessel 10), and can inject the data into a model of the environment used by the autonomy system.

In some embodiments, sensor processor 70 (and/or any other suitable processor(s)) can be programmed and/or otherwise configured to automatically perform an XR presentation process, in which sensor processor 70 (and/or any other suitable processor(s)) can render an image of a virtual object based on the position and orientation of the virtual object, and cause the rendered image of the virtual object to be presented overlayed on a view of an environment of marine vessel 10 (e.g., overlayed on image data captured by an image sensor, such as an image sensor included in a depth sensor, presented using a HUD through which the environment can be viewed, etc.). For example, as described below in connection with FIGS. 4 to 10C, sensor processor 70 (and/or any other suitable processor(s)) can render a 2D image of a virtual object based on the location and orientation of the virtual object (e.g., with respect to vessel 10), and based on a perspective from which the XR scene is viewed (e.g., a location and pose of a camera used to capture the image on which the rendered 2D image is overlayed, a perspective of an operator of vessel 10 viewing the XR scene via a HUD, etc.).

Figure 2:
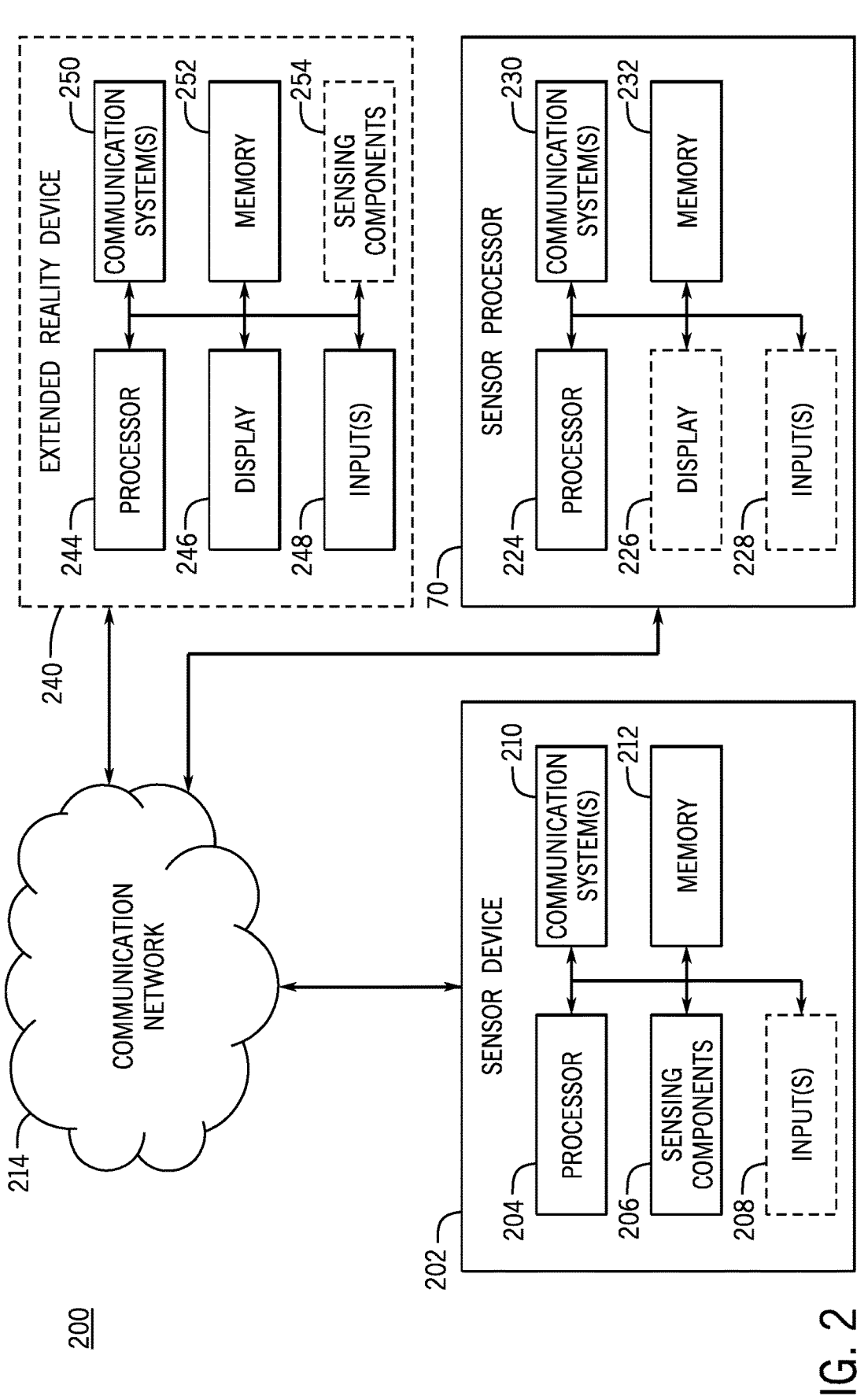
FIG. 2 shows an example of hardware that can be used to implement a sensor device, a sensor processor, and an extended reality device in accordance with some embodiments of the disclosure.

FIG. 2 shows an example of hardware 200 that can be used to implement a sensor device 202 sensor processor 70, and an extended reality device 240 in accordance with some embodiments of the disclosed subject matter.

As shown in FIG. 2, in some embodiments, sensor device 202 can include a processor 204, sensing components 206, one or more inputs 208, one or more communication systems 210, and/or memory 212. In some embodiments, processor 204 can be any suitable hardware processor or combination of processors, such as a central processing unit (CPU), an accelerated processing unit (APU), a graphics processing unit (GPU), a field programmable gate array (FPGA), an application specific integrated circuit (ASIC), etc.

In some embodiments, sensing components can include components that are used to determine a three-dimensional location of an object and/or other feature of an environment (e.g., a water surface) that is within a field of view of the sensor device 202, and/or to capture image data of a scene within a field of view of the sensor device 202. In some embodiments, sensor device 202 can include components used to implement one or more of depth sensors 72-78.

For example, depth sensor device 202 can be implemented as one or more cameras that include components that facilitate three-dimensional imaging of a region of an environment, such as a stereoscopic camera, a structured light camera, a continuous-wave time-of-flight camera, a direct time-of-flight camera, etc. As another example, depth sensor device 202 can be implemented as one or more lidar devices (e.g., a scanning lidar, a lidar including a 2D array sensor, etc.) that include components that facilitate three-dimensional characterization of a region of an environment. In such an example, a camera(s) (e.g., a two-dimensional camera) can be located to have an overlapping field of view with a lidar device (e.g., such a camera can be co-located), and can be used to capture images that can be used to classify portions of the environment (e.g., using a machine learning model trained to perform image segmentation). As yet another example, sensor device 202 can be implemented as one or more sound-based devices (e.g., one or more sonar systems, etc.) that include components that facilitate three-dimensional characterization of a region of an environment. As still another example, sensor device 202 can be implemented as one or more radio wave-based devices (e.g., one or more radar systems, etc.) that include components that facilitate three-dimensional characterization of a region of an environment.

In some embodiments, inputs 208 can include any suitable input devices and/or sensors that can be used to receive user input, such as a keyboard, a mouse, a touchscreen, a touchpad, a microphone, a camera, etc. In some embodiments, sensor device 202 can omit inputs (e.g., where depth sensor device is an embedded device, or where depth sensor device is not configured for direct end user operation).

In some embodiments, communication system(s) 210 can include any suitable hardware, firmware, and/or software for communicating information over a communication network 214 and/or any other suitable communication networks. For example, communication system(s) 210 can include one or more transceivers, one or more communication chips and/or chip sets, etc., that can be used to establish a wired and/or wireless communication link. In a more particular example, communication system(s) 210 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 212 can include any suitable storage device or devices that can be used to store instructions, values, etc., that can be used, for example, by processor 204 to generate depth information of a portion of the environment that characterizes the portion of the environment in three-dimensions, to identify and/or classify one or more objects and/or other features in a scene based on the depth information and/or image information, to communicate with sensor processor 70 via communications system(s) 210, etc. Memory 212 can include any suitable volatile memory, non-volatile memory, storage, or any suitable combination thereof. For example, memory 212 can include random access memory (RAM), read-only memory (ROM), electronically erasable programmable read-only memory (EEPROM), one or more flash drives, one or more hard disks, one or more solid state drives, one or more optical drives, etc.

In some embodiments, depth sensor device 202 can include any suitable display device(s) (not shown), such as a computer monitor, a touchscreen, a television, etc.

In some embodiments, memory 212 can have encoded thereon a computer program for controlling operation of depth sensor device 202. In such embodiments, processor 204 can execute at least a portion of the computer program to generate depth information, to identify and/or classify one or more objects and/or other features in a scene based on the depth information and/or image information, to transmit information to sensor processor 70, to execute at least a portion of a process for generating an XR environment, presenting one or more virtual objects in an XR scene, etc., such as processes described below in connection with FIGS. 4-8, etc.

In some embodiments, communication network 214 can be any suitable communication network or combination of communication networks. For example, communication network 214 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard(s), such as CDMA, GSM, LTE, LTE Advanced, 5G NR, etc.), a wired network, etc. In some embodiments, communication network 214 can include one or more portions of a control area network (CAN), a local area network (LAN), a wide area network (WAN), a public network (e.g., the Internet, which may be part of a WAN and/or LAN), any other suitable type of network, or any suitable combination of networks. Communications links shown in FIG. 2 can each be any suitable communications link or combination of communications links, such as wired links, fiber optic links, Wi-Fi links, Bluetooth links, cellular links, etc.

In some embodiments, sensor processor 70 can include a processor 224, a display 226, one or more inputs 228, one or more communication system(s) 230, and/or memory 232. In some embodiments, processor 224 can be any suitable hardware processor or combination of processors, such as a CPU, an APU, a GPU, an FPGA, an ASIC, etc. In some embodiments, display 226 can include any suitable display devices, such as a computer monitor, a touchscreen, a television, etc. In some embodiments, inputs 228 can include any suitable input devices and/or sensors that can be used to receive user input, such as a keyboard, a mouse, a touchscreen, a microphone, etc. In some embodiments, sensor processor 70 can omit inputs (e.g., where sensor processor 70 is an embedded device that is not configured for direct user interaction). For example, sensor processor 70 can provide results of an analysis, image data, and/or a portion of a user interface to CCM 24, and CCM 24 can use the results, image data, and/or user interface to present image data, model data, autonomy data, one or more virtual objects in an XR scene, etc.

In some embodiments, communication system(s) 230 can include any suitable hardware, firmware, and/or software for communicating information over communication network 214 and/or any other suitable communication networks. For example, communication system(s) 230 can include one or more transceivers, one or more communication chips and/or chip sets, etc., that can be used to establish a wired and/or wireless communication link. In a more particular example, communication system(s) 230 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 232 can include any suitable storage device or devices that can be used to store instructions, values, etc., that can be used, for example, by processor 224 to analyze image data and/or depth information received from depth sensor device 202 (and/or any other suitable depth sensor device), to identify and/or classify one or more objects and/or other features in a scene based on the depth information and/or image information, to communicate with depth sensor device 202 via communications system(s) 230, etc. Memory 232 can include any suitable volatile memory, non-volatile memory, storage, or any suitable combination thereof. For example, memory 232 can include RAM, ROM, EEPROM, one or more flash drives, one or more hard disks, one or more solid state drives, one or more optical drives, etc.

In some embodiments, memory 232 can have encoded thereon a computer program for controlling operation of sensor processor 70. In such embodiments, processor 224 can generate an XR environment, can inject virtual objects into a model used by an autonomy system of a vessel that includes sensor processor 70, can render a 2D image of a virtual object based on the location and orientation of the object, and a viewpoint from which the virtual object is expected to be viewed, analyze depth information to identify and/or classify one or more objects and/or other features in a scene based on the depth information and/or image information, to receive information from sensor device 202, to execute at least a portion of a process for generating an XR environment, presenting one or more virtual objects in an XR scene, etc., such as processes described below in connection with FIGS. 4-8, etc.

In some embodiments, extended reality device 240 can include a processor 244, a display 246, one or more inputs 248, one or more communication system(s) 250, memory 252, and/or sensing components 254. In some embodiments, processor 224 can be any suitable hardware processor or combination of processors, such as a CPU, an APU, a GPU, an FPGA, an ASIC, etc.

In some embodiments, display 246 can include any suitable display device(s), such as a transparent display or a non-transparent display (e.g., as described below in connection with FIG. 3). For example, in some embodiments, display 246 can be a transparent display of a head-mounted device (HMD) configured to present XR scenes, such as augmented reality and/or mixed reality scenes. As another example, display 246 can be a non-transparent display of an HMD configured to present XR scenes, such as augmented reality, mixed reality scenes, and/or virtual reality scenes. In such an example, the HMD can be configured as a pass-through device which presents video of the physical environment of a wearer, and virtual content overlaid on the video of the physical environment. As yet another example, display 246 can be a transparent display of a HUD, such as HUD 35. As still another example, display 246 can be a non-transparent display of vessel 10 (e.g., display 29) or a non-transparent display of a mobile computing device (e.g., a smartphone, a tablet computer, etc.).

In some embodiments, inputs 248 can include any suitable input device(s) and/or sensor(s) that can be used to receive user input, such as a gaze tracking system, a head tracking system, motion sensors, a microphone, a keyboard, a mouse, a touchscreen, etc.

In some embodiments, extended reality device 240 can omit inputs (e.g., where extended reality device 240 operates as an output for another device, such as sensor processor 70, CCM 24, etc., as an embedded device that is not configured for direct user interaction). For example, extended reality device 240 can receive image data to present from sensor processor 70.

In some embodiments, communication system(s) 250 can include any suitable hardware, firmware, and/or software for communicating information over communication network 214 and/or any other suitable communication networks. For example, communication system(s) 250 can include one or more transceivers, one or more communication chips and/or chip sets, etc., that can be used to establish a wired and/or wireless communication link. In a more particular example, communication system(s) 250 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 252 can include any suitable storage device or devices that can be used to store instructions, values, etc., that can be used, for example, by processor 244 to generate an XR scene, render a virtual object, determine movement of extended reality device 240, identify one or more anchor points in an XR scene, determine where in an XR scene to present a virtual object based on the position of one or more anchor points, determine a position of extended reality device 240, to communicate with sensor processor 70 and/or sensor device 202 via communications system(s) 250, etc. Memory 252 can include any suitable volatile memory, non-volatile memory, storage, or any suitable combination thereof. For example, memory 252 can include RAM, ROM, EEPROM, one or more flash drives, one or more hard disks, one or more solid state drives, one or more optical drives, etc.

In some embodiments, sensing components 254 can include components that are used to determine a three-dimensional location of an object and/or other feature of an environment (e.g., a water surface) that is within a field of view of one or more cameras and/or other sensors of extended reality device 240, and/or to capture image data of a scene within a field of view of one or more cameras of extended reality device 240.

In some embodiments, extended reality device 240 can include components used to implement one or more of depth sensors 72-78. For example, sensing components 254 of extended reality device 240 can include one or more cameras that include components that facilitate three-dimensional imaging of a region of an environment, such as a stereoscopic camera, a structured light camera, a continuous-wave time-of-flight camera, a direct time-of-flight camera, etc. As another example, sensing components 254 of extended reality device 240 can include one or more lidar devices (e.g., a scanning lidar, a lidar including a 2D array sensor, etc.) that include components that facilitate three-dimensional characterization of a region of an environment. In such an example, a camera(s) (e.g., a two-dimensional camera) can be located to have an overlapping field of view with a lidar device (e.g., such a camera can be co-located), and can be used to capture images that can be used to classify portions of the environment (e.g., using a machine learning model trained to perform image segmentation).

In some embodiments, memory 252 can have encoded thereon a computer program for controlling operation of extended reality device 240. In such embodiments, processor 244 can render a 2D image of a virtual object based on the location and orientation of the object, and based a viewpoint from which the virtual object is expected to be viewed, analyze depth information to identify and/or classify one or more objects and/or other features in a scene based on the depth information and/or image information, to identify one or more anchor points, to present the rendered virtual object at a position within the XR scene, to receive information from sensor device 202, to receive information from sensor processor 70, to execute at least a portion of a process for generating an XR environment, presenting one or more virtual objects in an XR scene, etc., such as processes described below in connection with FIGS. 4-8, etc. In some embodiments, extended reality device 240 can use any suitable hardware and/or software for rendering content, such as any suitable rendering pipeline (e.g. using polygon rendering techniques, raytracing rendering techniques, etc., which can be incorporated into a real-time graphics engine, such as UNITY 3D available from UNITY TECHNOLOGIES, UNREAL ENGINE available from EPIC GAMES, etc.). Additionally, in some embodiments, any suitable communications protocol(s) can be used to communicate control data, image data, audio, etc., between extended reality device 240 and any other device (e.g., sensor processor 70, sensor device 202, controller 24, etc.).

Figure 3:
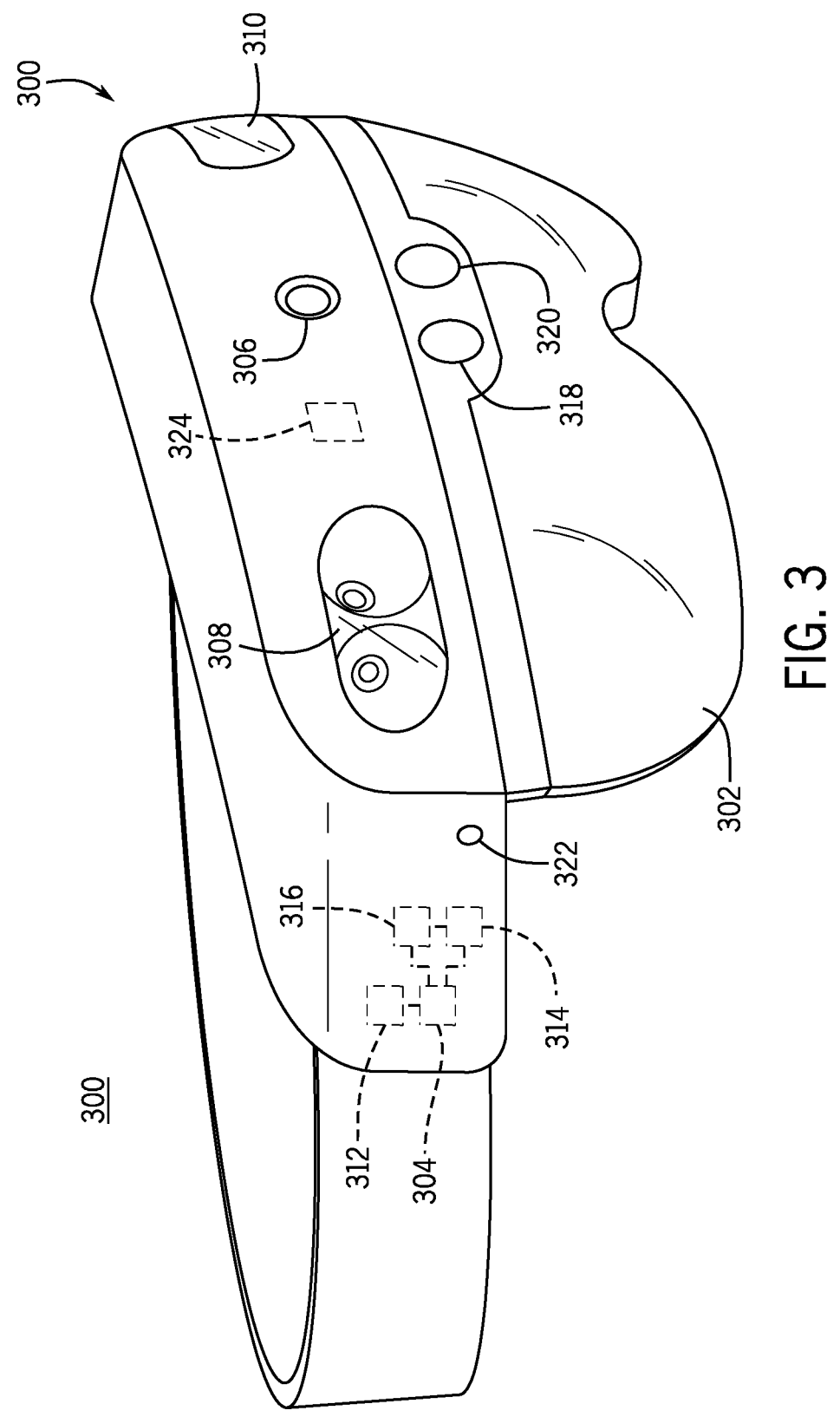
FIG. 3 shows an example of an extended reality device that can be used to present an extended reality scene in accordance with some embodiments of the disclosure.

FIG. 3 shows an example of an extended reality device 300 that can be used to present an extended reality scene in accordance with some embodiments of the disclosure. As shown in FIG. 3, extended reality (XR) device 300 can be implemented as a head mounted display (HMD), which can include a display processor 304 and a display 302 that can be used to present images, such as images of a virtual object(s) (sometimes referred to as holographic objects in augmented reality and mixed reality scenes), to the eyes of a wearer of XR device 300. In some embodiments, display 302 can be configured to visually augment an appearance of a physical environment to a wearer viewing the physical environment via display 302. For example, in some embodiments, the appearance of the physical environment can be augmented by graphical content (e.g., one or more pixels each having a respective color and brightness) that is presented via display 302 implemented as a transparent display to create a mixed reality (or augmented reality environment). Note that as used herein, mixed reality and augmented reality are meant to convey similar experiences, but a mixed reality environment may convey a more immersive environment than an augmented reality environment. Additionally or alternatively, in some embodiments, display 302 can be configured to render a fully opaque virtual environment (e.g., by using one or more techniques to block the physical environment from being visible through XR device 300). In some embodiments, a non-transparent display can be used in lieu of a transparent display as display 302. In some such embodiments, one or more cameras can be used to generate a real-time representation of at least a portion of the physical environment in which XR device 300 is located. For example, an HMD with a non-transparent display can simulate a mixed reality environment using images of a physical environment and graphics (e.g., 3D models) displayed with the images of the physical environment as though the graphics are physically present within the physical environment. In some such embodiments, XR device 300 can be used to present a virtual reality environment. In some such embodiments, the virtual reality environment can include a fully virtual environment. Alternatively, in some such embodiments, the virtual reality environment can be used to present an augmented reality or mixed reality scene via pass-through virtual reality techniques. For example, one or more cameras, such as a camera 306, a stereo camera 308, and/or a stereo camera 310 can be used to capture image data representing a physical environment around a user of XR device 300, and can present image data representing the physical environment around the user of XR device 300 using a non-transparent display (e.g., with virtual objects overlaid with the image data to present an augmented reality or mixed reality scene). As described above, the term extended reality is sometimes used herein to refer to technologies that facilitate an immersive experience, including augmented reality, mixed reality, and/or virtual reality.

As shown in FIG. 3, in some embodiments, display 302 can include one or more image producing elements (e.g., display pixels) located within lenses of display 302 (such as, for example, pixels of a see-through Organic Light-Emitting Diode (OLED) display). Additionally or alternatively, in some embodiments, display 302 can include a light modulator on an edge of the lenses.

In some embodiments, XR device 300 can include various sensors and/or other related systems. For example, XR device 300 can include a gaze tracking system 312 that can include one or more image sensors (e.g., with a field of view that includes one or more eyes of a wearer of XR device 300) that can generate gaze tracking data that represents a gaze direction of a wearer's eyes. In some embodiments, gaze tracking system 312 can include any suitable number and arrangement of light sources and/or image sensors. For example, gaze tracking system 312 of XR device 300 can utilize at least one inward facing sensor. In some embodiments, a wearer of XR device 300 can be prompted to permit the acquisition and use of gaze information to track a position and/or movement of the user's eyes.

In some embodiments, XR device 300 can include a head tracking system 314 that can utilize one or more motion sensors, such as motion sensors 316 shown in FIG. 3 (e.g., including one or more components of an IMU, as described above in connection with main IMU 36 and/or IMUs 62-68 of FIG. 1), to capture head pose data that can be used to track a head position of the wearer, for example, by determining the direction and/or orientation of the wearer's head. For example, in some embodiments, head tracking system 314 can include an inertial measurement unit configured as a three-axis and/or three-degree of freedom position sensor system.

In some embodiments, head tracking system 314 can also support other suitable positioning techniques, such as Global Positioning System (GPS) or other global navigation systems, indoor position tracking systems (e.g., using Bluetooth low energy beacons), etc. Further, while specific examples of position sensor systems have been described, any other suitable position sensor system(s) or any suitable combination of position sensor systems can be used. For example, head pose and/or movement data can be determined based on sensor information from any suitable combination of sensors mounted on the wearer and/or external to the wearer including but not limited to any number of gyroscopes, accelerometers, inertial measurement units (IMUs), GPS devices, barometers, magnetometers, cameras (e.g., visible light cameras, infrared light cameras, time-of-flight depth cameras, structured light depth cameras, etc.), communication devices (e.g., Wi-Fi antennas/interfaces, Bluetooth, etc.), etc.

In some embodiments, XR device 300 can include an optical sensor system that can utilize one or more outward facing sensors, such as camera 306, stereoscopic cameras 308 and/or 310, a depth camera 318 and associated light source 320, to capture image data of the environment. In some embodiments, the captured image data can be used to detect movements captured in the image data, such as gesture-based inputs and/or any other suitable movements by a user wearing XR device 300, by another person in the field of view of one or more components of the optical sensor system, and/or by a physical object within the field of view of one or more components of the optical sensor system.

In some embodiments, depth camera 318 can be an active depth camera that utilizes light source 320, such as a structured light camera, a continuous-wave time-of-flight camera, a direct time-of-flight camera, etc. In such examples, light source 320 can be configured to output light in any temporal and/or spatial pattern suitable to facilitate depth imaging via structured light techniques, continuous-wave time-of-flight techniques, direct time-of-flight techniques etc. In some embodiments, light source 320 can emit non-visible light (e.g., infrared light). Additionally or alternatively, in some embodiments, stereoscopic cameras 308 and/or 310 can be passive depth cameras that utilize ambient light and/or light from light source 320 to capture image data and/or generate depth information.

Additionally, in some embodiments, one or more outward facing sensor(s) of the optical sensor system can capture 2D image information and/or depth information from the physical environment and/or physical objects within the environment. For example, the outward facing sensor(s) can include a depth camera (e.g., depth camera 318), a visible light camera (e.g., having a CMOS or CCD sensor, a color filter array, etc.), an infrared light camera, a position tracking camera, and/or any other suitable image sensor or combination of image sensors.

In some embodiments, XR device 300 can include a microphone system that can include one or more microphones, such as microphone 322, that can capture audio data. In some embodiments, audio can be presented to the wearer via one or more speakers (not shown).

In some embodiments, XR device 300 can include a controller 324, which can include any suitable processor (e.g., a separate controller can be omitted, and processor 304, which can be implemented using processor 244, can operate as a controller for XR device 300, or controller 324 can be implemented by another processor(s), such as a processor described above in connection with processor 244), and memory (e.g., memory 252) that are in communication with the various sensors and systems of XR device 300. In some embodiments, controller 324 can store, in memory, instructions that are executable by the processor(s) to receive signal inputs from the sensors, determine a pose of XR device 300, and adjust display properties for content displayed using display 302.

In some embodiments, XR device 300 can have any other suitable features or combination of features, such as features incorporated into the HOLOLENS and HOLOLENS 2 from MICROSOFT CORP., MAGICLEAP 2 from MAGIC LEAP, INC., APPLE VISION PRO from APPLE, INC., or any other suitable wearable XR device. Note that the description herein of XR device 300 is merely for illustration of hardware that can be used in connection with the disclosed subject matter. However, the disclosed subject matter can be used with any suitable mixed reality device and/or augmented reality device, such as the HOLOLENS and HOLOLENS 2 from MICROSOFT CORP., MAGICLEAP 2 from MAGIC LEAP, INC., APPLE VISION PRO from APPLE, INC., etc.

As described above in connection with FIGS. 1 and 2, in some embodiments, the disclosed subject matter can be used in connection with non-wearable mobile computing devices (e.g., smartphones, tablet computers, etc.) and/or non-mobile devices (e.g., one or more MFDs, a personal computers, laptop computers, etc.). For example, a smartphone can be used to provide a mixed reality and/or augmented reality experience using a camera and display of the smartphone. As another example, a system(s) of vessel 10 can be used to provide a mixed reality and/or augmented reality experience (e.g., using a camera(s), such as depth sensor(s) 72-78, and a display, such as display 29).

FIG. 4 shows an example of a process 400 for facilitating autonomous operation of a non-virtual marine vessel in an extended reality environment that includes a virtual object in accordance with some embodiments of the disclosure.

At 402, process 400 can receive an instruction to add a virtual object(s) to an extended reality environment of a marine vessel (e.g., a non-virtual marine vessel executing process 400). In some embodiments, the instruction can be received from any suitable source, and in any suitable format. For example, in some embodiments, process 400 can receive an instruction to add a virtual object to the XR environment via a user interface of a device executing at least a portion of process 400. As example, in some embodiments, process 400 can receive an instruction to add a virtual object to the XR environment via a user interface of a device (e.g., a laptop computer, a smartphone, a tablet computer, a wearable computer, a cloud computing platform, etc.) in communication with a device executing at least a portion of process 400 (e.g., one or more processors of marine vessel 10).

At 404, process 400 can receive virtual object data that can be used to add a representation of the virtual object(s) in the XR environment and/or in an XR scene of the XR environment. In some embodiments, process 400 can receive the virtual object data from any suitable location and/or at any suitable time. For example, process 400 can receive and/or retrieve virtual object data from memory of a device executing at least a portion of process 400 (e.g., a virtual object repository). As another example, process 400 can receive and/or retrieve virtual object data from another device (e.g., a cloud server, a mobile device, etc.). In some embodiments, process 400 can omit 404. For example, if the virtual object data has already been received, or if the virtual object is an object that a device executing process 400 can draw (e.g., using one or more primitives), process 400 can omit receiving virtual object data at 404.

In some embodiments, the virtual object data can include data for any suitable object(s) that can be added to an XR scene. For example, virtual object data can include data that can be used to add and/or render a relatively simple three-dimensional (3D) geometric shape (e.g., a cube, a rectangular prism, a sphere, a cone, a pyramid, a cylinder, a triangular prism, a sphere, etc.), and/or a more complex 3D geometric shape. As another example, virtual object data can include data that can be used to add and/or render a more complex 3D geometric shape that can be drawn as a combination of two or more simpler 3D geometric shapes using one or more operations (e.g., an via a union operation that includes a union of the two or more shapes; via a combine operation that includes all of the two or more shapes, except an intersection; via an intersect operation that includes only an intersection of the two or more objects; via a subtract operation that excludes one or more of the objects and an intersection of the objects; etc.).

As yet another example, virtual object data can include data that can be used to add and/or render a more complex object, such as a virtual dock, virtual sea wall, virtual mooring ball, virtual vessel, a virtual navigation aid, buoy, etc. As still another example, virtual object data can include data that can be used to add and/or render portions of a virtual environment and/or a virtual course (e.g., an obstacle course, a race course, etc.).

At 406, process 400 can receive information indicative of a position and orientation of the virtual object(s) to be included in the XR environment with respect to the marine vessel and/or an XR device being used to present an XR scene. In some embodiments, the information indicative of a position and orientation of the virtual object(s) can be provided via user input to a user interface. For example, a user can provide input via a touchscreen interface (e.g., of MFD 29, of a mobile device, etc.). As another example, a user can provide input via keypad 28, a keyboard, a mouse, etc., configured as an input for a device executing process 400. As yet another example, a user can provide input via a camera(s), such as using hand movements that are captured by the camera and used to manipulate one or more portions of an XR environment and/or scene.

In some embodiments, the information indicative of a position and orientation of the virtual object(s) can be received from memory or from another device (e.g., memory of a device executing at least a portion of process 400, a device that provided virtual object data, etc.). For example, a virtual object can be associated with a predetermined position and/or orientation. In such an example, the predetermined position and/or orientation can be defined relative to a particular object (e.g., vessel 10), or a particular coordinate system (e.g., a global coordinate system associated with vessel 10, a camera coordinate system associated with a particular depth sensor, a geographical coordinate system used to designate locations on Earth, etc.).

In some embodiments, the information indicative of a position and orientation of the virtual object(s) can be determined based on one or more constraints associated with a virtual object, an XR environment, and/or an XR scene. For example, a particular virtual object can be associated with a constraint that it be placed at least a certain distance from a particular point (e.g., a point on vessel 10, a point from which the XR scene is being viewed, a position of a device, etc.). As another example, a particular virtual object can be associated with a constraint that it be placed in a portion of an environment and/or scene corresponding to water (e.g., labeled as water by a machine learning model). As yet another example, a particular virtual object can be associated with a constraint that it be placed in a portion of an environment and/or scene that is at least a predetermined distance from one or more physical objects in the scene.

In some embodiments, the virtual object(s) can include virtual objects and/or virtual markings on virtual objects that can be used to evaluate and/or validate behavior of an autonomy system in a particular situation(s). For example, the virtual objects can have a shape, size, and/or markings that an autonomy system is expected to react to in a particular way (e.g., with a particular action(s)), and process 400 can be used to add such a virtual object(s) to an XR environment. In such an example, actions (e.g., instructions, commands, etc.) taken by the autonomy system can be recorded and/or evaluated to determine whether the autonomy system reacted as expected, or reacted in some unexpected way(s).

In some embodiments, the virtual objects can include virtual objects and/or virtual markings that can be used as a particular type of virtual environment that can be traversed by a real vessel(s). For example, a particular area of a physical environment (e.g., a particular area on a river, lake, sea, etc.) can be associated with a virtual environment (e.g., virtual obstacle course, a virtual race course, a virtual marina, etc.), and a user can initiate implementation of the course in an XR environment and/or scene. As another example, a particular virtual environment can be associated with a portion of the physical environment of the vessel. In such an example, a user can observe and/or experience how the marine vessel behaves as an autonomy system of the marine vessel performs one or more autonomous operations, such that the user can evaluate and/or gain confidence in capabilities of the autonomy system in various situations and/or in a safe environment.

In some embodiments, the virtual object can be a simulation of a real object in a portion of an environment specified by a user. For example, the virtual object(s) can represent one or more objects in a particular portion of an environment (e.g., a place where the user is planning to store a vessel, such as a slip, a dock, a marine, a boathouse, etc.). In such an example, a user can observe and/or experience how the marine vessel behaves as an autonomy system of the marine vessel performs one or more autonomous operations in a particular environment (e.g., an environment in which a potential boat buyer is considering docking the vessel), such that the user can evaluate and/or gain confidence in capabilities of the autonomy system in that particular type of environment without transporting the vessel to such a real world environment, and/or can evaluate whether the there is sufficient space for the vessel, etc.

At 408, process 400 can cause data corresponding to the virtual object to be incorporated in a model of a non-virtual environment of the marine vessel, such that an autonomy system interprets the virtual object as though it were present in the non-virtual environment. For example, process 400 can cause data corresponding to the virtual object to be incorporated in a 3D model of the environment (e.g., a point cloud). As another example, process 400 can cause data corresponding to the virtual object to be incorporated in a 2D model of the environment (e.g., an occupancy grid).

In some embodiments, process 400 can use any suitable technique or combination of techniques to incorporate virtual object data into a model of the non-virtual environment of the marine vessel. For example, process 400 can receive a model of the non-virtual environment (e.g., generated and/or updated by an autonomy system based on data from one or more sensors, such as depth sensors 72-78), modify and/or update the received model using compatible data representing the virtual object(s), and provide the modified model to the autonomy system.

As another example, process 400 can provide data representing the virtual object(s) to the autonomy system in a format that causes the autonomy system to incorporate the data for the virtual object(s) into the model. In a more particular example, process 400 can add the virtual object data to a stream of sensor data provided to the autonomy system.

As yet another example, process 400 can use one or more of processes 500 and/or 600 to cause data corresponding to the virtual object to be incorporated in a model of the non-virtual environment of the marine vessel.

At 410, process 400 can provide the model, with both virtual objects and real objects, to an autonomy system of the marine vessel. For example, process 400 can provide a data structure that represents the model (e.g., a tensor, an octree, etc.). In such an example, a tensor can be a 2D tensor, a 3D tensor, or a higher dimension tensor. In a more particular example, a 2D tensor can include an array of elements (e.g., each corresponding to a cell of an occupancy grid), and a value in the element can be indicative of whether there is an obstacle in the portion of the environment corresponding to the element (e.g., a 1 can indicate the presence of an obstacle and a 0 can indicate absence of an obstacle and/or a navigable region, or a value can indicate a probability that the cell is occupied using a decimal value). As another more particular example, a 3D or higher dimension tensor can include an array of elements (e.g., each corresponding to a cell of an occupancy grid), with the first two dimensions indicative of whether there is an obstacle in the portion of the environment corresponding to the element, and a third (and/or higher dimension) indicative of a characteristic of an object(s) at the cell (e.g., a class of an object at the location), and/or any other suitable information.

In some embodiments, process 400 can omit 410. For example, if process 400 provides the virtual object data, and the virtual object data is used to generate the model (e.g., by the autonomy system, and/or another system), process 400 can omit providing the model with the virtual object data incorporated at 410.

At 412, process 400 can operate the marine vessel in the XR environment using the autonomy system to perform one or more operations. For example, the autonomy system can use a model of the XR environment, including data corresponding to the virtual object(s), when planning a path for autonomous and/or semi-autonomous navigation (e.g., automatic docking, automatic trailer loading or unloading, automatic collision avoidance, autonomic navigation through areas that include other vessels and/or other obstacles, autonomic waypoint navigation, etc.). As another example, the autonomy system can use such a model of the XR environment when being operated at least in part by an operator (e.g., velocity limiting for object avoidance, maintenance of a buffer zone, etc.).

In some embodiments, process 400 can cause the marine vessel to be operated in the XR environment using the autonomy system to perform one or more operations using a model of the XR environment, in lieu of, or in addition to, operating the marine vessel the marine vessel in the XR environment using the autonomy system to perform one or more operations. For example, if a device executing process 400 is not incorporated into the marine vessel (e.g., if it is a computing device in communication with the marine vessel), providing the model at 410, and/or causing data to be included in the model at 408 can cause the autonomy system to operate the marine vessel using a model of the XR environment.

At 414, process 400 can generate a record that includes a position of at least the virtual object with respect to the marine vessel. For example, such a record can include information that can be used to evaluate the position of the marine vessel with respect to virtual objects in an XR environment over time. In a particular example, the information can include data points representing a position and orientation of the marine vessel over time, and data points representing a position and orientation of each virtual object over time. As another particular example, the information can include visual data representing a position and orientation of the marine vessel over time, and/or a position and orientation of each virtual object over time. In such an example, the visual data can include images captured by depth sensors of the marine vessel, 2D and/or 3D rendering of at least part of the virtual portion of the XR environment (e.g., as described below in connection with FIG. 9), segmented (and/or otherwise classified) image data, etc.

In some embodiments, process 400 can record any suitable data associated with operation of the marine vessel in the XR environment. For example, process 400 can cause input provided to the autonomy system to be recorded. As another example, process 400 can cause output provided from the autonomy system (e.g., instructions, commands, etc.) to be recorded, such as outputs that cause one or more actions to be taken by a component of the marine vessel (e.g., a change in thrust, steering, etc.). As yet another example, process 400 can cause values generated by one or more sensors (e.g., depth sensors, IMUs, etc.) to be recorded.

In some embodiments, process 400 can cause data recorded at 414 to be stored in non-volatile memory.

In some embodiments, process 400 can omit 414. For example, if process 400 is being used to allow a potential user of a marine vessel (e.g., a potential buyer, renter, etc.) to evaluate and/or gain confidence in capabilities of the autonomy system in various situations and/or in a safe environment, process 400 can omit recording data that would not otherwise be recorded.

At 416, process 400 can generate and present an XR scene that includes the virtual object(s) based on a viewing perspective from which the XR scene is to be viewed, and a position and orientation of the virtual object(s). In some embodiments, process 400 can use any suitable technique or combination of techniques to generate and present the XR scene. For example, as described in connection with FIGS. 1-3 and 10A to 10C, process 400 can render a view of a virtual object in the XR environment, and can place the rendered virtual object in an XR scene at a position and orientation based on the position and orientation of the virtual object received at 406, and based on a perspective from which the XR scene is expected to be viewed. As another example, process 400 can use techniques described in U.S. patent application Ser. No. 18/397,036, which is hereby incorporated by reference herein in its entirety.

In some embodiments, process 400 can use one or more anchor points (e.g., corresponding to a relatively static portion of the environment in the XR scene) as a reference point for rendering and/or placing the virtual object(s). Additionally or alternatively, in some embodiments, process 400 can estimate a plane in the environment (e.g., a plane of a water surface in the environment), and can use the location of the plane in the XR scene as a reference for placing the virtual object(s).

In some embodiments, process 400 can update a location of a virtual object(s) in the scene as a position and/or orientation of the virtual object changes with respect to the marine vessel, and/or as the perspective from which the XR scene is being viewed changes. For example, process 400 can receive an updated virtual object position and/or orientation associated with a virtual object(s), and/or can receive an updated perspective from which the virtual object(s) is to be viewed. In some embodiments, a virtual object can move, resulting in an update in a position and/or orientation of the virtual object. For example, the virtual object can be a virtual vessel that moves under the influence of a virtual propulsion system. As another example, the virtual object can be a floating object that moves under the influence of waves, currents, and/or tides (e.g., virtual or physical). As yet another example, the virtual object can move in response to an interaction with an object in the physical environment (e.g., vessel 10, another vessel, etc.). In such an example, a collision with a virtual object can cause the virtual object to move, which can be implemented as an updated virtual object position and/or orientation.

Additionally or alternatively, in some embodiments, a perspective from which the virtual object and/or XR scene is viewed can change, resulting in a different view of the virtual object and/or XR scene. For example, vessel 10 can move, resulting in a different posture of one or more depth sensors 72-78 with respect to the virtual object and/or XR scene that is being presented. As another example, a mobile computing device being used to present an XR scene (e.g., a smartphone, a tablet computer, an HMD, etc.) can move relative to the virtual object and/or XR scene that is being presented. In such examples, positions and/or orientations of virtual objects within the XR scene can be updated to remain consistent with respect to the physical environment (e.g., as though the objects are part of the physical environment, and do not change position and orientation with a change in position of vessel 10 and/or a device presenting the XR scene).

In some embodiments, process 400 can determine whether a virtual object has moved out of a portion of XR scene being presented, and into a portion of the XR scene that is within a FOV of a different camera and/or depth sensor. For example, if image data from a camera and/or depth sensor is being used to present the XR scene, if the virtual object moves relative to vessel 10 (e.g., due to movement of the virtual object with respect to the environment and/or movement of the vessel with respect to the environment), process 400 can determine whether the virtual object has moved into a FOV of a different camera and/or depth sensor. If the virtual object has moved into another camera FOV, process 400 can change a camera that is used to capture image data used to generate and/or present the XR scene.

At 418, process 400 can cause a user interface to be presented that includes information indicative of an action(s) taken by the autonomy system in the presence of the virtual object(s), and/or information indicative of the position of objects in a model of the XR environment being used by the autonomy system. In some embodiments, such a user interface can include any suitable user interface elements, and/or can present any suitable information. For example, process 400 can cause one or more views of a virtual and/or real portion of the XR environment to be shown (e.g., a 2D render(s) of a 3D virtual environment that includes a virtual object(s). As another example, process 400 can cause images of the environment (e.g., captured by depth sensors 72-78) to be presented. In such an example, process 400 can cause classification information to be presented with image data (e.g., as a segmentation mask, a bounding box(es), etc.). As yet another example, process 400 can cause a visualization of a model of the XR environment used by the autonomy system to be presented. As still another example, process 400 can cause other information that is relevant to performance of the autonomy system to be presented (e.g., as text, one or more graphics, etc.). In a more particular example, process 400 can cause user interface elements described below in connection with FIG. 9 to be presented.

FIG. 5 shows an example of a process 500 for incorporating a virtual object(s) into a model of a non-virtual environment of the non-virtual marine vessel in accordance with some embodiments of the disclosure. In some embodiments, process 500 can be used to cause data corresponding to the virtual object to be incorporated in a model of a non-virtual environment of the non-virtual marine vessel at 408. In some embodiments, process 500 can be performed by any suitable computing device and/or any suitable system. For example, process 500 can be performed, at least in part, by an autonomy system of a marine vessel (e.g., implemented via controller 24, sensor processor 70, and/or any other suitable computing devices). As another example, process 500 can be performed, at least in part, by another processor of a marine vessel that is not part of an autonomy system. As yet another example, process 500 can be performed, at least in part, by a computing device (e.g., a laptop computer, a smartphone, a tablet computer, a wearable computer, a server, etc.) that is in communication with one or more systems of the marine vessel (e.g., via a communication network, such as communication network 214).

At 502, process 500 can receive proximity information that can be used to determine the position of objects in an environment area around a vessel (e.g., vessel 10) associated with process 500. In some embodiments, the proximity information can be based on proximity measurements generated by one or more proximity sensors (e.g., proximity sensors 72-78).

In some embodiments, the proximity information can have any suitable format and/or can be received in multiple formats. For example, the proximity information can be formatted as point cloud data (e.g., which can be labeled point cloud data as described above in connection with FIG. 2, or unlabeled point cloud data). As another example, in some embodiments, the proximity information can be formatted as one or more depth images (e.g., one or more one or more depth images, such as RGBD image data). As yet another example, in some embodiments, the proximity information can be formatted as an occupancy grid (e.g., as described above in connection with FIGS. 1 and 2).

In some embodiments, process 500 can receive (and/or retrieve) the proximity information from any suitable source (e.g., from memory, such as memory 212, memory 232, and/or any other suitable memory; from a processor, such as processor 204, processor 224, and/or any other suitable processor; etc.).

At 504, process 500 can generate and/or update an occupancy grid (and/or any other suitable model(s) that can be used to facilitate autonomous and/or advanced operator assistance control of the vessel) based on proximity to real objects in a non-virtual environment of the marine vessel (e.g., a real portion of an XR environment). In some embodiments, process 500 can use any suitable technique or combination of techniques to generate and/or update an occupancy grid, such as techniques described above in connection with FIG. 1. In some embodiments, in addition to, or in lieu of, generating and/or updating an occupancy grid, process 500 can generate and/or update any suitable model (e.g., a 2D model, a 3D model) of the environment that can be used by an autonomy system to facilitate autonomous and/or advanced operator assistance control of the vessel.

At 506, process 500 can receive virtual proximity information that can be used to determine the position of virtual objects in a virtual environment area around a vessel (e.g., a virtual portion of an XR environment of vessel 10) associated with process 500. In some embodiments, the virtual proximity information can be based on location information associated with one or more virtual objects (e.g., in the global coordinate system, in a camera coordinate system associated with a particular proximity sensor, in geographic coordinates, etc.) determined based on the location and orientation of the virtual object(s). Additionally or alternatively, in some embodiments, the virtual proximity information can be based on a location(s) of the virtual object(s) in a digital twin of the extended reality environment (e.g., as described below in connection with FIG. 8).

Additionally or alternatively, in some embodiments, process 500 can receive a virtual occupancy grid that reflects a location of virtual objects in a virtual portion of the XR environment.

At 508, process 500 can update the occupancy grid (and/or any other suitable model(s) that can be used to facilitate autonomous and/or advanced operator assistance control of the vessel) based on the virtual occupancy grid data. In some embodiments, process 500 can use any suitable technique or combination of techniques to update the occupancy grid. For example, process 500 can add data representing the virtual objects to the occupancy grid generated and/or updated at 504 (e.g., by marking cells corresponding to a portion of the a virtual object as occupied). As another example, process 500 can merge data from the occupancy grid generated and/or updated at 504 and a virtual occupancy grid generated and/or received at 506.

In some embodiments, an updated occupancy grid at 508 can be used to facilitate autonomous and/or advanced operator assistance control of the vessel (e.g., at 412 of FIG. 4).

FIG. 6 shows another example of a process 600 for incorporating a virtual object(s) into a model of a non-virtual environment of the non-virtual marine vessel in accordance with some embodiments of the disclosure. In some embodiments, process 600 can be used to cause data corresponding to the virtual object to be incorporated in a model of a non-virtual environment of the non-virtual marine vessel at 408. In some embodiments, process 600 can be performed by any suitable computing device and/or any suitable system. For example, process 600 can be performed, at least in part, by an autonomy system of a marine vessel (e.g., implemented via controller 24, sensor processor 70, and/or any other suitable computing devices). As another example, process 600 can be performed, at least in part, by another processor of a marine vessel that is not part of an autonomy system. As yet another example, process 600 can be performed, at least in part, by a computing device (e.g., a laptop computer, a smartphone, a tablet computer, a wearable computer, a server, etc.) that is in communication with one or more systems of the marine vessel (e.g., via a communication network, such as communication network 214).

At 602, process 600 can receive proximity information that can be used to determine the position of objects in an environment area around a vessel (e.g., vessel 10) associated with process 600. In some embodiments, process 600 can receive the proximity information in any suitable format and/or from any suitable source (e.g., as described above in connection with 502 of FIG. 5).

At 604, process 600 can receive virtual proximity information of virtual objects in the XR environment. In some embodiments, process 600 can receive the virtual proximity information in any suitable format and/or from any suitable source (e.g., as described above in connection with 506 of FIG. 5). In some embodiments, the virtual proximity information can be in a similar format to the proximity information received at 602, and the proximity information and virtual proximity information can be merged into a single 3D model (e.g., a single point cloud) of the XR environment (e.g., by the autonomy system), which can be used to generate a model, such as an occupancy grid, used by the autonomy system.

At 606, process 600 can generate and/or update an occupancy grid (and/or any other suitable model(s) that can be used to facilitate autonomous and/or advanced operator assistance control of the vessel) based on proximity to real and/or virtual objects in an XR environment. In some embodiments, process 600 can use any suitable technique or combination of techniques to generate and/or update an occupancy grid based on real and virtual proximity data, such as techniques described above in connection with FIG. 1. In some embodiments, in addition to, or in lieu of, generating and/or updating an occupancy grid, process 600 can generate and/or update any suitable model (e.g., a 2D model, a 3D model) of the environment that can be used by an autonomy system to facilitate autonomous and/or advanced operator assistance control of the vessel.

In some embodiments, an updated occupancy grid at 508 can be used to facilitate autonomous and/or advanced operator assistance control of the vessel (e.g., at 412 of FIG. 4).

Figure 7:
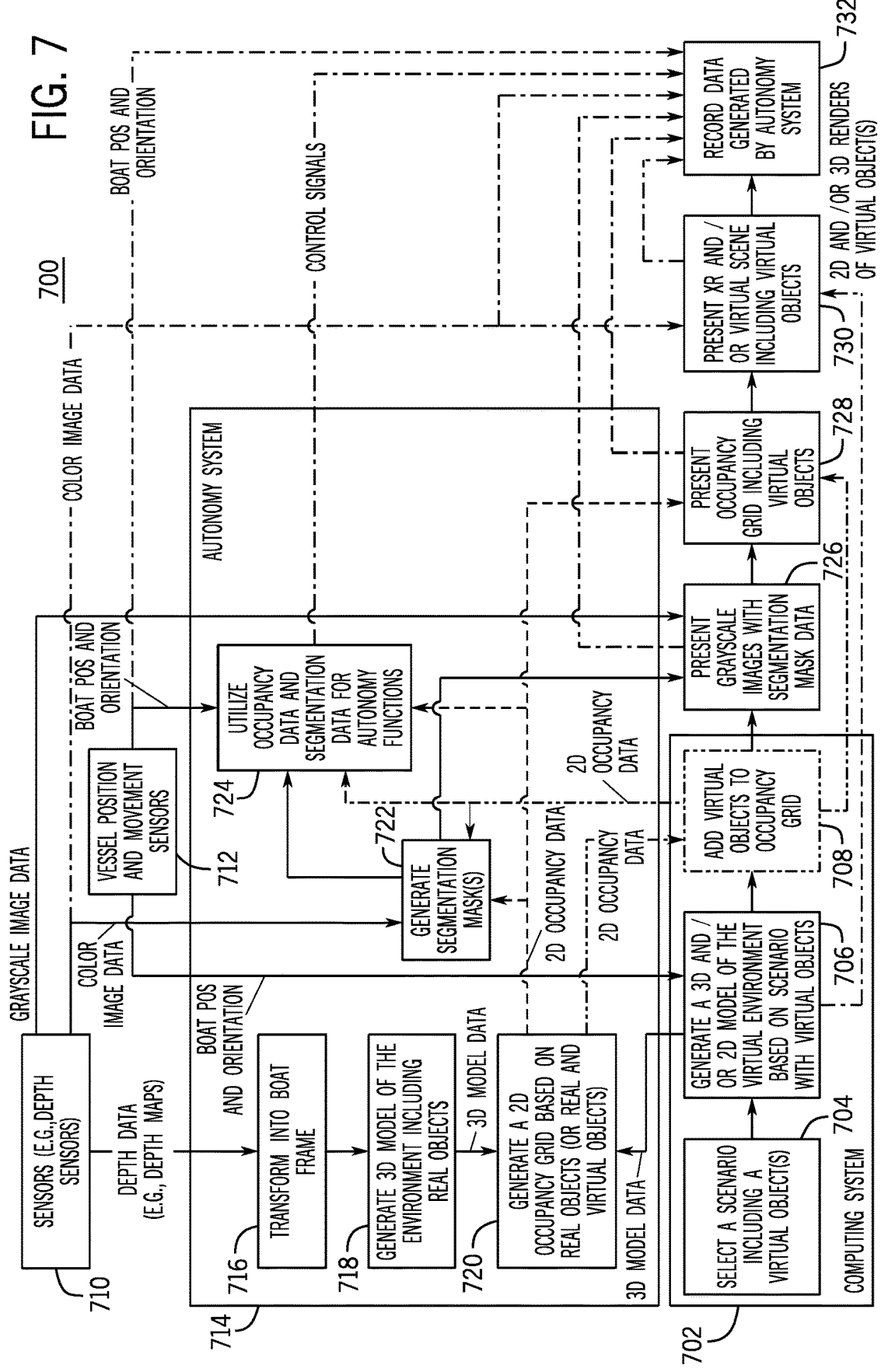
FIG. 7 shows an example of a flow for facilitating autonomous operation of a non-virtual marine vessel in an extended reality environment that includes a virtual object in accordance with some embodiments of the disclosure.

FIG. 7 shows an example of a flow 700 for facilitating autonomous operation of a non-virtual marine vessel in an extended reality environment that includes a virtual object in accordance with some embodiments of the disclosure. In some embodiments, flow 700 can include a computing system 702 (e.g., controller 24, sensor processor 70, a mobile computing device such as a laptop computer, etc.) receiving an indication, at 704, of a scenario, including one or more virtual objects, to instantiate in an extended reality (XR) environment of a vessel. In some embodiments, a scenario can be selected and/or initiated in response to any suitable action. For example, a user can select and/or initiate a scenario that includes one or more objects via a user interface presented by computing device 702 (e.g., via a GUI, via a voice input, etc.). As another example, computing device 702 can automatically (e.g., without user input) select and/or initiate a scenario that includes one or more objects via a user interface presented based on one or more environmental cues. In such an example, user input can be required to start a scenario (e.g., via input received indicating user confirmation that a scenario is to be started).

In some embodiments, a scenario selected at 704 can include any suitable virtual objects and/or other suitable information that can be used to generate an XR environment. For example, a scenario can include a particular placement and orientation for various virtual objects, with respect to any suitable reference point (e.g., a position of the marine vessel when the scenario is initiated, a particular geographic location, etc.). In some embodiments, flow 700 can include receiving a 3D model (e.g., a 3D mesh) of a virtual object(s) from a virtual object repository (e.g., in memory, such as memory 232 or memory 252).

Figure 9:
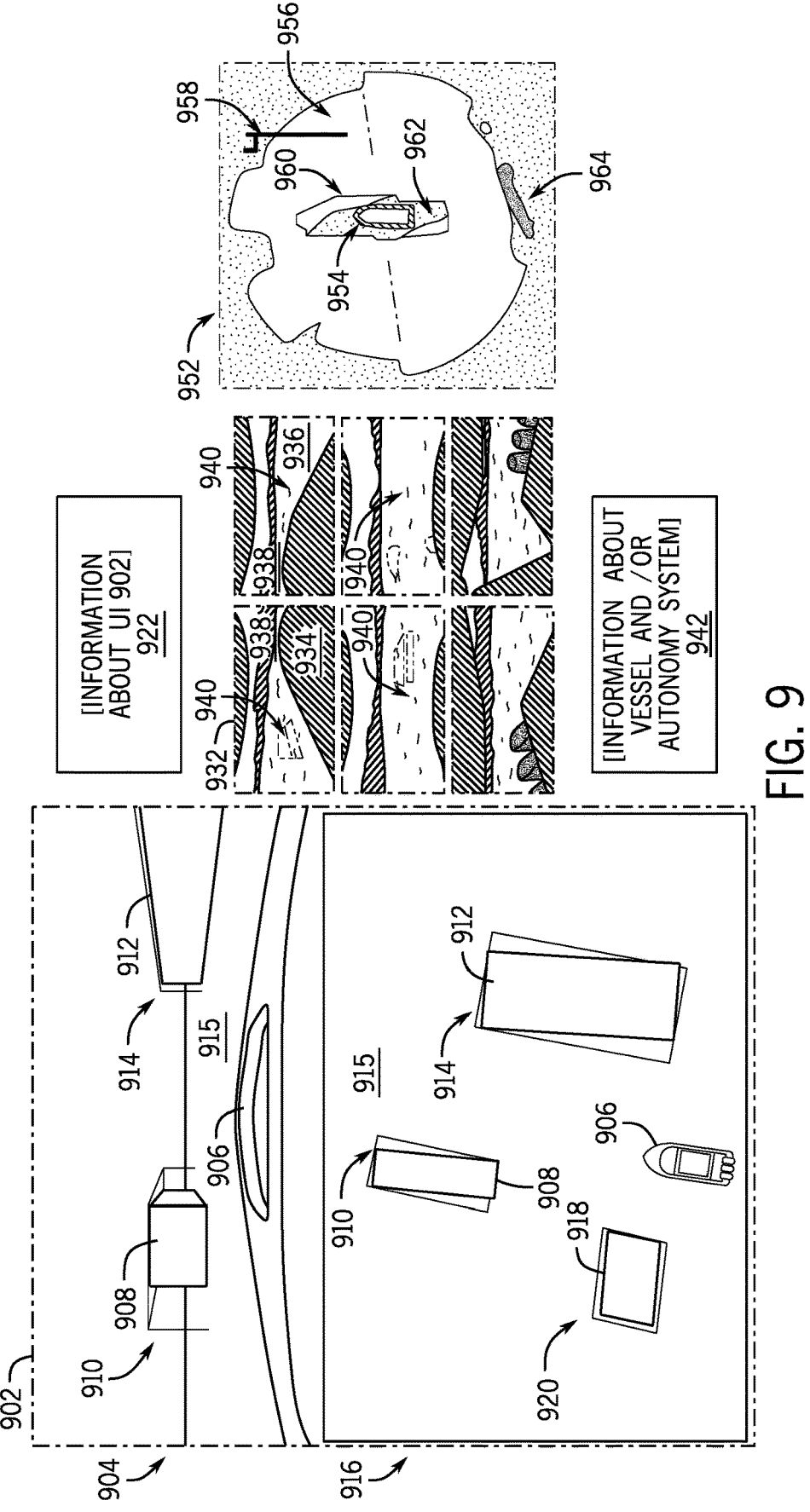
FIG. 9 shows an example of portions of a user interface for validating autonomous operation of a non-virtual marine vessel in an extended reality environment that includes a virtual object in accordance with some embodiments of the disclosure.

In some embodiments, flow 700 can include generating, at 706, a 3D and/or 2D model of at least a virtual portion of the environment based on the scenario selected at 704. In some embodiments, flow 700 can include generating any suitable type of model or combination of models, such as a fully rendered 3D environment (e.g., as shown in FIG. 9), a point cloud, a 2D occupancy grid (e.g., based on positions, postures, and shapes of the virtual objects), etc.

In some embodiments, a model(s) generated at 706 can be based on, and/or updated based on, a location and/or movement of the marine vessel (e.g., received from position and/or movement sensors). For example, movement and/or position information can be used to update a virtual model to reflect changes in a position of the vessel and/or virtual objects with respect to the XR environment.

In some embodiments, a processor(s) (e.g., processor 224, CCM 24, etc.) executing one or more components of an autonomy system 714 can receive image data and/or depth data from one or more depth sensors and/or other sensors 710 associated with vessel 10. In some embodiments, autonomy system 714 can utilize information received from sensors 710 to determine a position and/or classification of one or more objects in an environment of vessel 10 (e.g., a real portion of an XR environment).

Additionally, in some embodiments, a processor(s) (e.g., processor 224, CCM 24, etc.) executing one or more components of an autonomy system 714 can receive vessel position and/or movement information from one or more position and/or movement sensors 712 associated with vessel 10 (e.g., GPS receiver 40, one or more of IMU(s) 36 and 62-68, etc.).

In some embodiments, flow 700 can include, at 716, autonomy system 714 transforming depth data received from sensors 710 into the global coordinate system (e.g., if the depth data has not been transformed by the sensor from which it is received).

In some embodiments, flow 700 can include, at 718, autonomy system 714 generating and/or updating a 3D model of the environment including real objects in the environment represented in depth data generated by depth sensors 710. In some embodiments, such a 3D model can be in any suitable format, such as a point cloud.

In some embodiments, flow 700 can include, at 720, autonomy system 714 generating and/or updating a 2D model of the environment based on real objects (e.g., included in the 3D model generated at 718). In some embodiments, autonomy system 714 can generate and/or update the 2D model using any suitable technique or combination of techniques, such as techniques described above in connection with FIG. 1.

Additionally, in some embodiments, autonomy system 714 can receive 3D model data generated at 706 that includes information about a position of virtual objects with respect to the vessel, and at 720, autonomy system 714 can generate a 2D model of the environment that is based on both real objects and virtual objects in the XR environment. In some embodiments, 3D data generated at 706 can be a separate model, or can be integrated into the model generated at 718 (e.g., 3D data generated at 706 can be provided as depth data similar to data received from sensors 710).

Additionally or alternatively, in some embodiments, autonomy system 714 can be configured to provide a 2D model of the XR environment generated at 720 based on real objects to computing system 702. In some such embodiments, flow 700 can include, at 708, computing system 708 can combine 2D occupancy data generated at 720 with 2D occupancy data generated at 706. In some embodiments, a combined 2D model can be used in execution of autonomy functions by autonomy system 714.

In some embodiments, flow 700 can include, at 722, autonomy system 714 generating classification information (e.g., segmentation information, object detection information, etc.). In some embodiments, autonomy system can use any suitable technique or combination of techniques to generate classification information, such as techniques described above in connection with FIG. 1.

In some embodiments, flow 700 can include, at 724, autonomy system 714 executing one or more autonomy functions based on a 2D model of the environment (e.g., an occupancy grid), a 3D model of the environment (e.g., a point cloud), and/or segmentation information. In some embodiments, autonomy system 714 can use perform any suitable autonomy functions, such as autonomy functions described above in connection with 412 of FIG. 4, and elsewhere.

In some embodiments, flow 700 can include, at 726, presenting grayscale images (e.g., from depth sensors 710) with segmentation masks indicating a classification of the objects in the image(s). For example, as described below in connection with FIG. 9, flow 700 can present real-time images captured by depth sensors with segmentation masks showing which portions of the environment are classified as different types of objects. In some embodiments, virtual objects added to the XR scene can be included in the real-time images captured by depth sensors with segmentation masks, as shown in FIG. 9. For example, segmentation at 722 can be performed using color image data, and 2D (e.g., as shown in FIG. 9) or 3D model data (not shown), which can cause the segmentation mask to data for the virtual objects.

In some embodiments, flow 700 can include, at 728, presenting a representation of the 2D model (e.g., occupancy grid) data used to facilitate autonomy functions at 724. For example, as described below in connection with FIG. 9, flow 700 can present an updated representation of a model used by the autonomy system, such as a portion of an occupancy grid near the marine vessel. In such an example, the virtual objects can be incorporated into the model consistent with how the autonomy system adds data corresponding to real objects detected in the environment to the model, and/or data corresponding to virtual objects in the model can be preprocessed (e.g., for use with a path planning function) consistent with how the autonomy system preprocesses data corresponding to real objects detected in the environment. In a more particular example, the model can include data corresponding to the closest edges of objects to the vessel, and can exclude some points corresponding to an object that has not been detected by the vision system (e.g., for real objects in the environment, internal points or points occluded by other objects and/or a different portion of the object), or an object (e.g., a virtual object) that has not been in a FOV of the vision system. Such points can be omitted, removed, or otherwise excluded from the model of the environment used by the autonomy system (e.g., for path planning). As another more particular example, the model can include data corresponding to the closest edges of objects to the vessel, and can exclude some points corresponding to an object that has not been detected by the vision system (e.g., for real objects in the environment) or an object that has not been detected (and/or has not been within a FOV of) a vision system of the digital twin (e.g., for virtual objects in the virtual portion of the XR environment).

In some embodiments, flow 700 can include, at 730, presenting one or more images of the virtual portion of the environment (e.g., as shown in FIG. 9), and/or one or more XR scenes of the XR environment including both real and virtual objects (e.g., as described below in connection with FIGS. 10A to 10C).

In some embodiments, flow 700 can include, at 732, recording data generated by the autonomy system (e.g., commands to one or more systems of vessel 10), data used by the autonomy system (e.g., a state of the 3D model(s) generated and/or updated at 706 and/or 718, a state of the 2D model(s) generated and/or updated at 706 and/or 720, segmentation data, vessel movement data, etc.), color image data, grayscale image data, masked grayscale image data, data representing the virtual environment (e.g., a 2D and/or 3D rendering of the virtual portion of the XR environment, position and orientation information of virtual objects with respect to a coordinate system, etc.). In some embodiments, such data can facilitate evaluation and/or validation of the autonomy system to determine whether it is behaving as expected. For example, different versions of the autonomy system (e.g., after an update, with different implementations, etc.) can be evaluated under similar conditions (e.g., in the same scenario) relatively quickly and easily.

Figure 8:
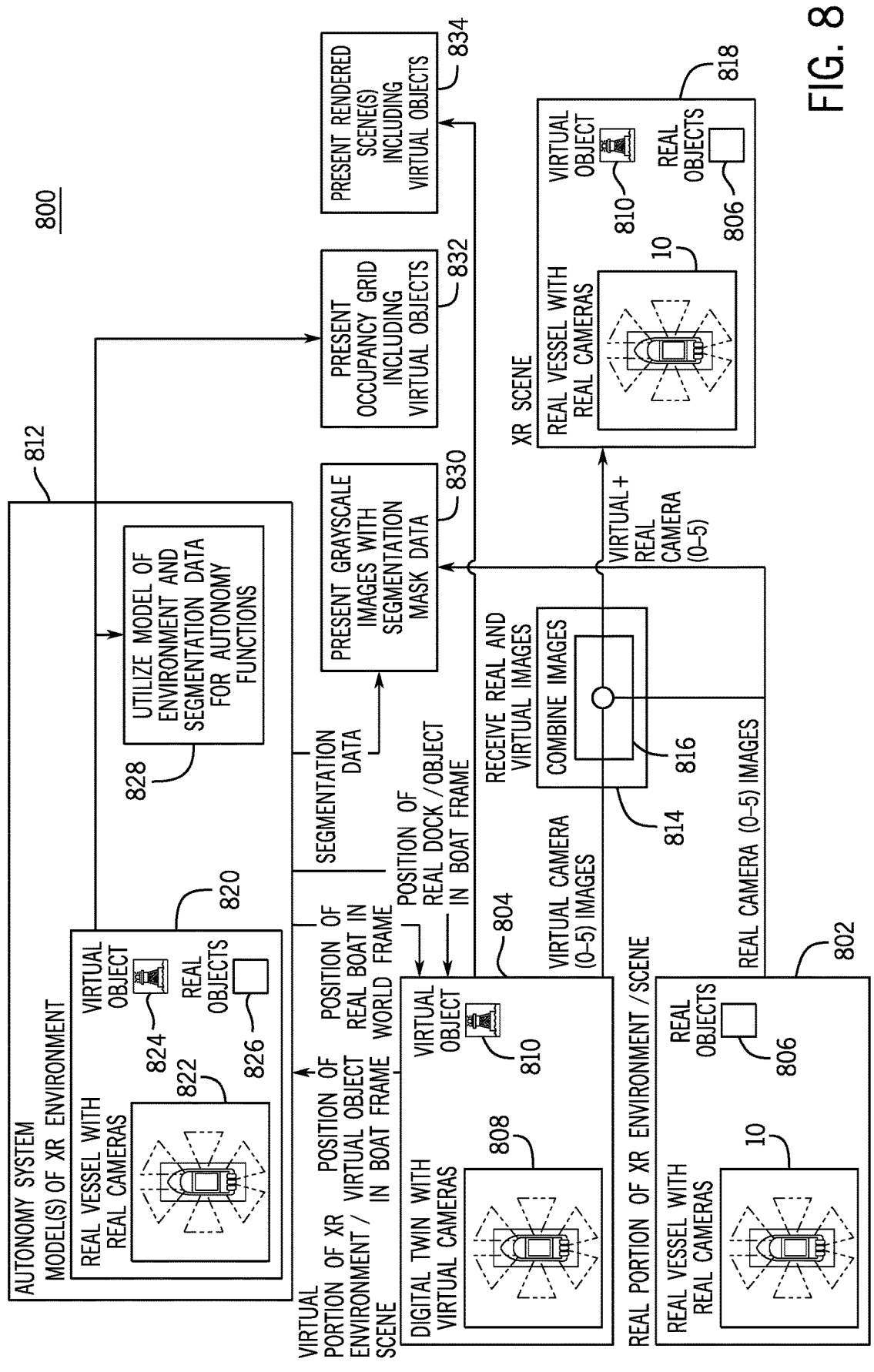
FIG. 8 shows an example of a flow for facilitating autonomous operation of a non-virtual marine vessel in an extended reality environment that includes a virtual object using a 3D rendering pipeline and a digital twin of the extended reality environment in accordance with some embodiments of the disclosure.

FIG. 8 shows an example of a flow 800 for facilitating autonomous operation of a non-virtual marine vessel in an extended reality environment that includes a virtual object using a 3D rendering pipeline and a digital twin of the extended reality environment in accordance with some embodiments of the disclosure.

In some embodiments, flow 800 can include a real portion 802 of an XR environment and/or scene, and a virtual portion 804 of the XR environment and/or scene. In some embodiments, real portion 802 can include vessel 10, having various cameras (e.g., depth sensors 72-78) each having a FOV of the physical environment in real portion 802, including at least one camera that captures image data of an object 806. Additionally, in some embodiments, virtual portion 804 can include a digital twin 808 of vessel 10, having various virtual cameras, each corresponding to a camera of vessel 10 and having a corresponding FOV of virtual portion 804 to the FOV of the camera's FOV of real portion 802. Virtual portion 804 can include a virtual object 810 within a portion of the scene, which can be rendered as part of a 3D virtual environment representing virtual portion 804 and/or can be rendered (e.g., in 2D) for each virtual camera that includes virtual object 810 within its FOV (note that one or more additional virtual camera views of virtual portion 804 can be rendered based on a virtual camera position and orientation that is not fixed to digital twin 808). In some embodiments, virtual portion 804, including digital twin 808 and virtual object 810 can be generated using a real-time graphics engine, such as a game engine (e.g., UNREAL ENGINE, UNITY, etc.), which can render virtual object 810 from the perspective of each virtual camera. Additionally, in some embodiments, the real-time graphics engine can receive information from an autonomy system 812 of vessel 10, which can include information about objects in the environment (e.g., types of objects, location of objects with respect to vessel 10, an estimated plane of a water surface, etc.), and/or position and/or orientation information of vessel 10 in any suitable coordinate system (e.g., geographic coordinates). For example, autonomy system 812 can provide information about objects in the environment determined using depth sensors of vessel 10, and/or autonomy system 812 can provide position and/or orientation information of vessel 10 determined using a location sensor(s) (e.g., from INS 60, GPS receiver 40, etc.) and/or motion information (e.g., from main IMU 36 and/or one or more of IMUs 62-68)).

In some embodiments, the real-time graphics engine can use information from autonomy system 812 to determine placement of virtual object(s), such as virtual object 810, in virtual portion 804 (e.g., with respect to the plane of a water surface, to avoid collisions with real objects, etc.), and/or to determine a position and/or orientation of digital twin 808 with respect to objects in real portion 802. For example, the real-time graphics engine can use position and orientation information (e.g., from INS 60, from GPS receiver 40, etc.) and/or motion information (e.g., from main IMU 36 and/or one or more of IMUs 62-68) to determine a position and orientation of digital twin 808 with respect to virtual portion 804, such that digital twin 808 is maintained, at least approximately, in the same position and orientation with respect to virtual portion 804 as the position and orientation of vessel 10 with respect to real portion 802.

In some embodiments, flow 800 can include autonomy system 812 generating and/or updating a model(s) 820 of the XR environment, which can include vessel data 822 of vessel 10 (e.g., indicating a position, orientation, size, and/or shape of vessel 10 with respect to the XR environment), and object data 824 and 826 for virtual and real objects, respectively. As described above (e.g., in connection with FIGS. 4, 6, and 7), model 820 can be generated by autonomy system 812 based on real object in real portion 802, and modified by another computing device (e.g., a computing device executing the real-time graphics engine) to include data for virtual objects in virtual portion 804. As described above (e.g., in connection with FIGS. 4, 5, and 7), model 820 can be generated by autonomy system 812 based on real object in real portion 802 and virtual objects in virtual portion 804 (e.g., a computing device, such as a computing device executing the real-time graphics engine, can provide data for the virtual objects to autonomy system prior to generation and/or updating of model 820 by autonomy system 812).

In some embodiments, flow 800 can include, at 828, autonomy system 812 executing one or more autonomy functions based on a 2D model of the environment (e.g., an occupancy grid), a 3D model of the environment (e.g., a point cloud), and/or segmentation information (e.g., as described above in connection with 724 of FIG. 7).

In some embodiments, flow 800 can include receiving, at 814, image data from real cameras of vessel 10, and image data from virtual cameras of digital twin 808 (e.g., at a processor(s), such as processor 224, processor 244, or CCM 24). In some embodiments, flow 800 can include combining, at 816, the real image data and corresponding virtual image data (e.g., using any suitable image fusion technique or combination of techniques), such that objects in virtual portion 804 are included in the combined image data with objects from real portion 806.

In some embodiments, flow 800 can include presenting (e.g., using display 29) a portion of an extended reality (XR) scene 818 (e.g., using image data generated at 816 for a particular camera FOV) that includes vessel 10, real object 806, and virtual object 810. In some embodiments, as vessel 10 moves through real portion 802, the movements can be reflected by digital twin 808 in virtual portion 804, such that a position of virtual object 810 in XR environment 820 and in XR scene 818 can be maintained relative to real object 806 and other portions of the physical environment of real portion 802.

In some embodiments, flow 800 can include, at 830, presenting grayscale images with segmentation masks indicating a classification of the objects in the image(s) (e.g., as described above in connection with 726 of FIG. 7).

In some embodiments, flow 800 can include, at 832, presenting a representation of the 2D model (e.g., occupancy grid) data used to facilitate autonomy functions at 828 (e.g., as described above in connection with 728 of FIG. 7).

In some embodiments, flow 800 can include, at 834, presenting one or more images of the virtual portion of the environment (e.g., as shown in FIG. 9), and/or one or more XR scenes of the XR environment including both real and virtual objects (e.g., as described below in connection with FIGS. 10A to 10C).

Additionally, as described above in connection with 414 of FIGS. 4 and/or 732, flow 800 can include recording data generated by the autonomy system, data used by the autonomy system, color image data, grayscale image data, masked grayscale image data, data representing the virtual environment, any other suitable data, etc.

FIG. 9 shows an example of portions of a user interface 900 for validating autonomous operation of a non-virtual marine vessel in an extended reality environment that includes a virtual object in accordance with some embodiments of the disclosure.

In some embodiments, user interface 900 can include a user interface portion 902 that includes one or more views (e.g., as 2D images) of a 3D model of a virtual portion of an XR environment constructed by a real-time graphics engine (e.g., a game engine). As shown in FIG. 9, user interface portion 902 can include a first view 904 from a first virtual camera (note that view 904 does not necessarily represent a virtual camera that is positioned to correspond to a depth sensor of the marine vessel). In the example of FIG. 9, first view 904 includes a portion of a virtual vessel 906 (e.g., a digital twin of vessel 10), a view of a first virtual object 908 and a second virtual object 912 from a first perspective, and corresponding bounding boxes 910 and 914, respectively, and a virtual water surface 915. Additionally, second view 916 includes another view of virtual vessel 906, another view of first virtual object 908 and second virtual object 912 from an overhead perspective, and a view of a third virtual object 918 and a corresponding bounding box 920 from the same overhead perspective. In some embodiments, bounding boxes shown in FIG. 9 can be omitted from visualizations of the 3D model.

In some embodiments, user interface 900 can include a user interface portion 922 that includes information about what is being presented in user interface portion 902. For example, user interface portion 922 can include a time since the scenario depicted in user interface portion 902 was started. As another example, user interface portion 922 can include a frame rate at which the 3D environment shown in user interface portion 902 is being updated. As yet another example, user interface portion 922 can include identifying information of the scenario depicted in user interface portion 902. As still another example, user interface portion 922 can include information indicating a connection status of a connection between an autonomy system of the marine vessel and a device generating the virtual portion of the environment shown in user interface portion 902. As a further example, user interface portion 922 can include identifying information of a mode in which the autonomy system is functioning (e.g., indicative of a particular autonomous navigation task being performed and/or a level of assistance provided by the autonomy system).

In some embodiments, user interface 900 can include a user interface portion 932 that includes one or more images combined with classification information. For example, as shown in FIG. 9, various images captured by depth sensors mounted on a vessel are shown with portions of the images depicted in different styles (e.g., colors, etc.) based on a class of the feature(s) in that portion of the image. As shown in FIG. 9, portions of an image corresponding to vessel can be labeled as a class 934, and portions of the environment can be labeled (e.g., water can be classified with a water class 936, land and land-based vegetation can be classified with a land or other suitable class 938, potential obstructions can be labeled with an object class 940, etc.). In some embodiments, differences between classes can be depicted in the images using any suitable technique. For example, portions labeled as different classes can be depicted in different colors (e.g., ego vessel 934 can be a first color, portions labeled as a water class 936 can be depicted in grayscale, etc.).

In some embodiments, user interface 900 can include a user interface portion 942 that includes information about operation of the vessel. For example, user interface portion 942 can include commands and/or instructions provided to, and/or output by, the autonomy system (e.g., a command to provide a particular thrust, a command to enter a particular mode, a a command to exit a particular mode). As another example, user interface portion 942 can include an indication of a current measured acceleration of the vessel along various axes (e.g., X, Y, and Z axes) and/or around various axes (e.g., indicative of roll, pitch, and yaw). As yet another example, user interface portion 942 can include an indication of a currently commanded velocity and/or acceleration (e.g., commanded by an autonomy system, commanded by a thrust lever, etc.) of the vessel along various axes and/or around various axes. As still another example, user interface portion 942 can include an indication of a current measured velocity of the vessel along various axes and/or around various axes. As a further example, user interface portion 942 can information indicating a measured heading of the vessel. As another further example, user interface portion 942 can include identifying information of a mode in which the autonomy system is functioning (e.g., indicative of a particular autonomous navigation task being performed and/or a level of assistance provided by the autonomy system).

In some embodiments, user interface 900 can include a user interface portion 952 that includes a visual representation of a model of a marine vessel and a portion of an environment around the vessel (e.g., an occupancy grid). For example, as shown in FIG. 9, user interface portion 952 can include a representation 954 of the marine vessel. As another example, portions of the model representing portions of the environment that are within a field of view of the vision system can be depicted in a first color or style 956, portions of the model representing relatively new obstructed portions of the environment (e.g., relatively new observations) can be depicted in a second color or style 958, a projected depth sensor blind spot 960 (e.g., based on a blind spot mask) can be depicted as an outline around vessel 954, portions of the model representing portions of the environment for which there is no data can be depicted in a third color or style 962, and portions of the model representing relatively old obstructed portions of the environment (e.g., observations that have been relatively consistent over time) can be depicted in a fourth color or style 964 (e.g., points corresponding to obstructions can change color or style based on whether the point has been consistently observed over a defined period of time, mitigating a risk that the points are noise).

Figure 10A:
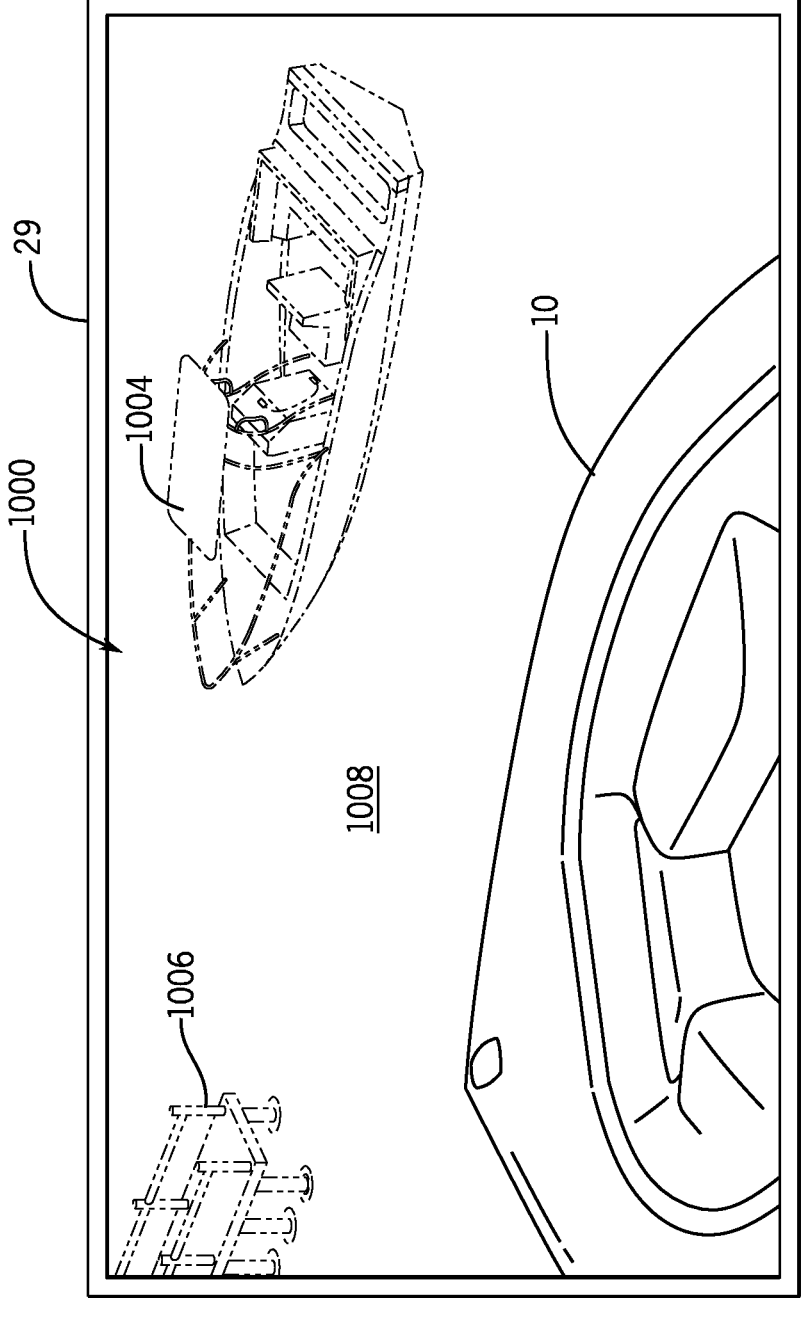
FIG. 10A shows an example of an extended reality scene that includes a non-virtual marine vessel and virtual objects being presented by a two-dimensional display of the marine vessel in accordance with some embodiments of the disclosure.

FIG. 10A shows an example of an extended reality scene 1000 that includes a non-virtual marine vessel and virtual objects being presented by a two-dimensional display of the marine vessel in accordance with some embodiments of the disclosure. As shown in FIG. 10A, a two-dimensional display device, such as an MFD (e.g., display 29 in the example shown in FIG. 10A) can present XR scene 1000, which includes a portion of vessel 10, and virtual objects 1004, 1006. As described above in connection with FIGS. 1 to 4, an image of virtual object 1004 can be rendered based on a position and orientation of virtual objects 1004, 1006 with respect to a camera (e.g., a camera of a depth sensor, such as one of depth sensors 72-78) used to capture image data used to generate an image that makes up a portion of XR scene 1000. In some embodiments, mechanisms described herein can use a relatively static portion(s) of the environment, as an anchor point (sometimes referred to as a spatial anchor). In some embodiments, a position of some virtual objects, such as virtual boats, virtual docks, virtual mooring balls, virtual navigation markers, virtual debris, etc., can be restricted to placement in or around a portion of the XR scene that includes a sufficiently sized area of water, such as water surface 1008. In some embodiments, mechanisms described herein can use a portion(s) of an object, such as a portion of vessel 10, that can be expected to remain within the XR scene (e.g., within a field of view of at least one camera of the system presenting the XR scene) as an anchor point. In some such embodiments, a static portion of the environment may not be available (e.g., in open water), or may be too far from a location of the virtual object to reliable place the virtual object. For example, in some embodiments, mechanisms described herein can use one or more anchor points on a hull of vessel 10, and can render virtual objects 1004, 1006 and/or one or more additional virtual objects in a position relative to the anchor point.

Figure 10B:
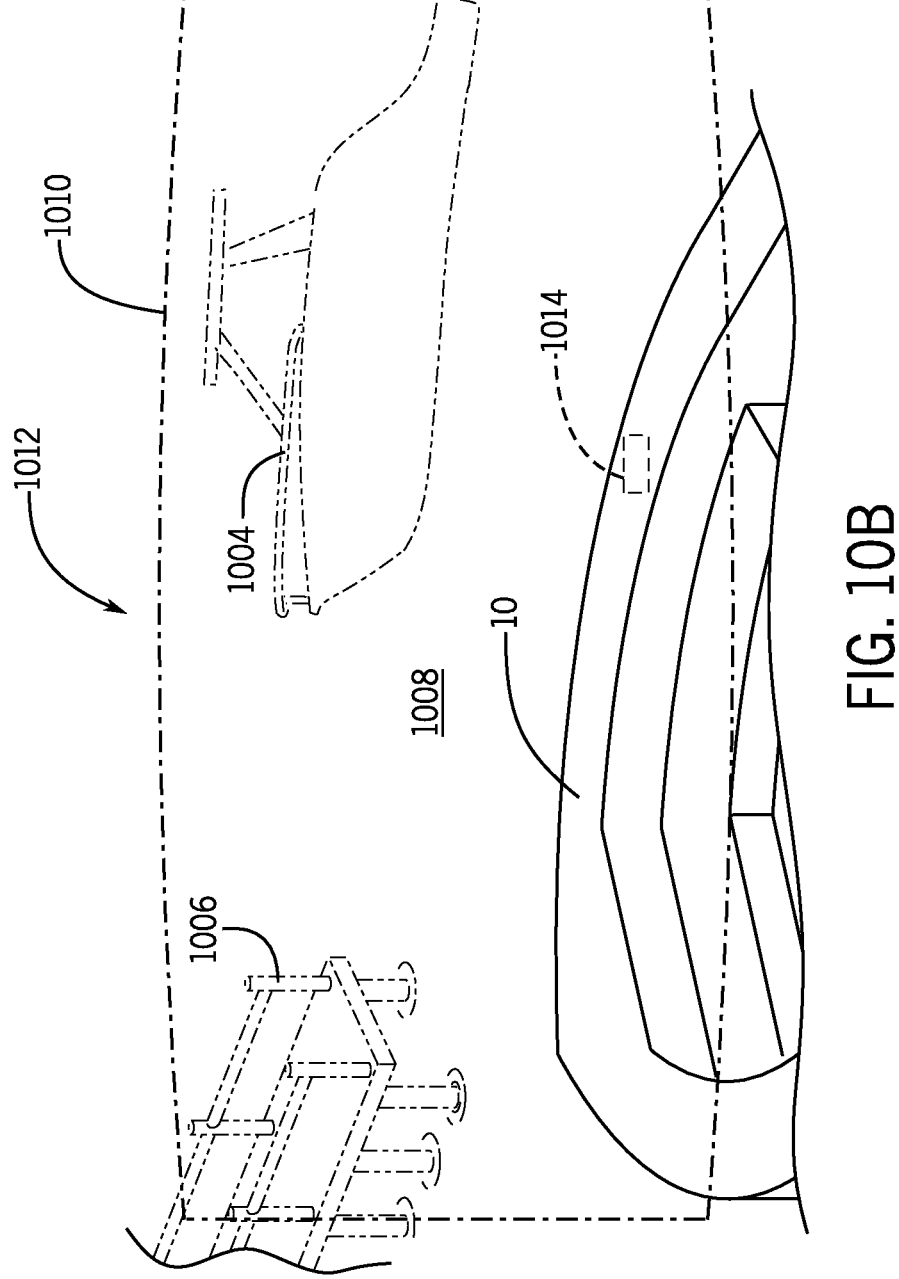
FIG. 10B shows an example of an extended reality scene that includes a non-virtual marine vessel and virtual objects being presented by a mobile extended reality device in accordance with some embodiments of the disclosure.

FIG. 10B shows an example of an extended reality scene 1010 that includes a non-virtual marine vessel and virtual objects being presented by a mobile extended reality device in accordance with some embodiments of the disclosure. As shown in FIG. 10B, a mobile extended reality device, such as an HMD, a smartphone, or a table computer (e.g., extended reality device 240, HMD 300, etc.) can present XR scene 1010, which includes a portion of vessel 10, and virtual object 1004, in environment 1012. As described above in connection with FIGS. 1-4, an image of virtual object 404 can be rendered based on a position and orientation of virtual object 1004 with respect to the mobile XR device used to view XR scene 1010, and virtual object 1004 can be presented as part of XR scene 1010. In some embodiments, mechanisms described herein can use a relatively static portion(s) of the environment as an anchor point. For example, mechanisms described herein can use one or more anchor points in the environment, as an anchor point, and can render virtual objects 1004, 1006 and/or one or more additional virtual objects in a position relative to the anchor point, which can mitigate position errors that may cause virtual objects 1004, 1006 to appear to move position with movements of the mobile XR device and/or vessel 10, such that a position of virtual objects 1004, 1006 can be maintained with respect to the static anchor point. Additionally or alternatively, in some embodiments, mechanisms described herein can use a portion(s) of an object, such as a portion of vessel 10, that can be expected to remain within the XR scene (e.g., within a field of view of at least one camera of the system presenting the XR scene) as an anchor point. Additionally, in some embodiments, mechanisms described herein can use one or more fiducial markers 1014 to determine a location and/or pose of the extended reality device with respect to the location of the fiducial marker. In some embodiments, mechanisms described herein can determine a transform between a coordinate system associated with the mobile XR device and a coordinate system (e.g., a global coordinate system) associated with vessel 10. In some embodiments, a known location of the fiducial marker(s) in the coordinate system associated with the vessel can be used to determine the transform between coordinate systems and/or a location and pose of the mobile extended reality device. In some embodiments, fiducial marker 1014 can be any suitable object and/or pattern that can be used to determine a distance and angle from which an image of fiducial marker 1014 was captured, such as a QR code, or other 2D machine readable code.

Figure 10C:
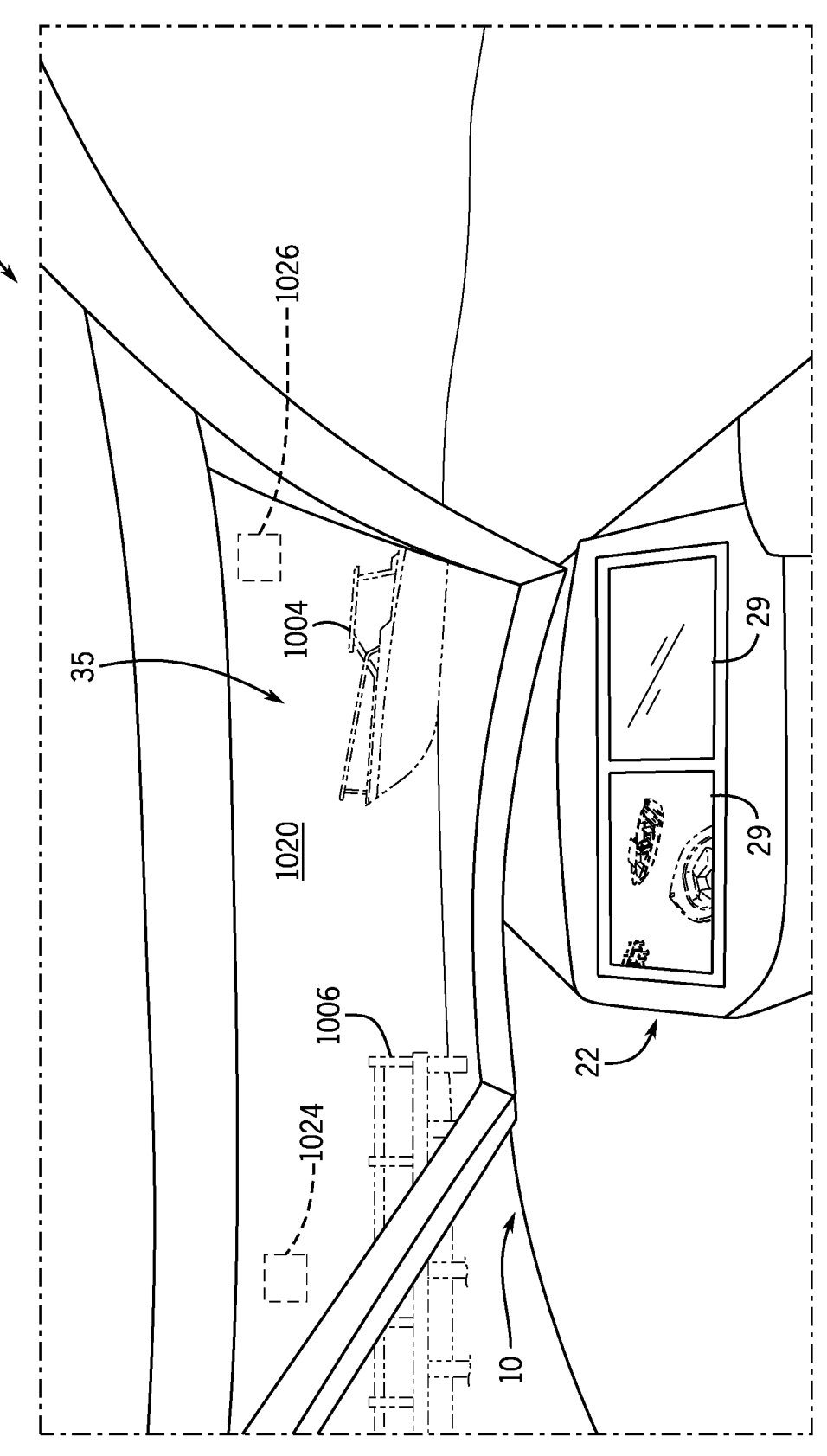
FIG. 10C shows an example of an extended reality scene that includes a non-virtual marine vessel and virtual objects being presented by a heads-up display of the marine vessel in accordance with some embodiments of the disclosure.

FIG. 10C shows an example of an extended reality scene 1020 that includes a non-virtual marine vessel and virtual objects being presented by a heads-up display of the marine vessel in accordance with some embodiments of the disclosure. As shown in FIG. 10C, a HUD (e.g., HUD 35) can present XR scene 1020, which includes a portion of vessel 10, and virtual object 1004, in environment 1022. As described above in connection with FIGS. 1-4, an image of virtual object 1004 can be rendered based on a position and orientation of virtual objects 1004, 1006 with respect to HUD 35 and/or a viewpoint of a user, and virtual objects 1004, 1006 can be presented as part of XR scene 1020.

In some embodiments, for example as described below, mechanisms described herein can use a relatively static portion(s) of the environment, as an anchor point. Additionally or alternatively, in some embodiments, mechanisms described herein can use a portion(s) of an object, such as a portion of vessel 10, that can be expected to remain within the XR scene (e.g., within a field of view of a user via HUD and/or within a field of view of at least one camera of the system presenting the XR scene) as an anchor point. Additionally, in some embodiments, mechanisms described herein can use one or more fiducial markers 1024 and/or 1026 to determine a location and/or viewpoint of a user viewing the extended reality scene via HUD 35 (e.g., using a head-mounted imaging device to capture fiducial markers 1024 and/or 1026). In some embodiments, mechanisms described herein can determine a viewing perspective of a user based on a known location of the fiducial marker(s) in the coordinate system associated with the vessel. In some embodiments, fiducial markers 1024 and/or 1026 can be any suitable object and/or pattern that can be used to determine a distance and angle from which an image of fiducial marker 1024 and/or 1026 was captured, such as a QR code, or other 2D machine readable code. Additionally or alternatively, in some embodiments, as shown in FIG. 10C, in some embodiments, one or more additional extended reality scenes can be presented using a display(s) 29 of vessel 10 (e.g., as shown in FIG. 10A).

Further Examples Having a Variety of Features

Implementation examples are described in the following numbered clauses:

1. A method for placing a virtual object in an environment of a non-virtual marine vessel, the method comprising: receiving an instruction to add a virtual object to a model of the environment used to facilitate one or more autonomous operations of the non-virtual marine vessel; receiving information indicative of an object position and object orientation at which to place the virtual object within the environment with respect to the marine vessel; and adding data that represents the virtual object to the model, such that an autonomy system of the non-virtual marine vessel identifies the virtual object as a non-virtual object in the environment.

2. The method of clause 1, further comprising: determining three-dimensional location information associated with an object in the environment of the marine vessel in a three-dimensional global coordinate system based on a transform between a camera coordinate system associated with a first camera and the global coordinate system, wherein a plurality of cameras, including the first camera, is configured to be mounted to the marine vessel with an associated field of view of an environment of the marine vessel, and wherein each of the plurality of cameras is associated with a three-dimensional camera coordinate system; and generate the model of the environment based on the three-dimensional location information associated with the object.

3. The method of clause 2, wherein each camera of the plurality of cameras comprises a stereoscopic camera.

4. The method of any one of clauses 2 or 3, further comprising: receiving virtual object data associated with the virtual object, wherein the virtual object data comprises information indicative of a shape of the virtual object; determining a position and orientation of the virtual object within the global coordinate system based on the information indicative of the object position and object orientation at which to place the virtual object; identifying one or more positions in the global coordinate system occupied by the virtual object based on the object position and the object orientation at which to place the virtual object, and the virtual object data; and adding points corresponding to the one or more positions in the global coordinate system to the model of the of the environment.

5. The method of any one of clauses 2 to 4, further comprising: receiving an image from the first camera, wherein the image includes a portion of the environment that corresponds to a portion of the model of the environment that includes at least a portion of the virtual object; receiving segmentation information associated with the first camera, wherein the segmentation information includes classification information associated with features located in a field of view associated with the first camera, and classification information associated with the portion of the virtual object; and presenting, using a display device, a masked image based on the image and the segmentation information.

6. The method of any one of clauses 1 to 5, wherein the model of the environment comprises a point cloud comprising a plurality of points, each of the plurality of points corresponding to a location on a surface of an object in the environment.

7. The method of any one of clauses 1 to 5, wherein the model of the environment comprises an occupancy grid comprising a plurality of cells, wherein a value associated with each cell is indicative of a probability that the cell is occupied by an obstruction in the environment.

8. The method of clause 7, further comprising: generating a two-dimensional image representing at least a portion of the model of the environment; and presenting, using a display device, the two-dimensional image representing at least a portion of the model of the environment.

9. The method of any one of clauses 1 to 8, further comprising: receiving, from the autonomy system, a version of the model of the environment; adding the data that represents the virtual object to the version of the model based on the information indicative of the object position and object orientation at which to place the virtual object, thereby generating an updated model of the environment that includes the virtual object; and providing the updated model of the environment to the autonomy system, such that the autonomy system of the non-virtual marine vessel identifies the virtual object as a non-virtual object in the environment.

10. The method of any one of clauses 1 to 9, the method further comprising: generating, using a real-time graphics engine, a digital twin of the non-virtual marine vessel, wherein the digital twin comprises a plurality of virtual cameras, including at least a first virtual camera and a second virtual camera, wherein each of the plurality of virtual cameras is positioned with respect to the digital twin to have an associated field of view of a virtual environment of the digital twin of the marine vessel that corresponds to a field of view associated with a camera of cameras, including at least a first camera and a second camera, each of the plurality of cameras is configured to be mounted to the marine vessel with an associated field of view of an environment of the marine vessel, and each of the plurality of cameras is associated with a three-dimensional camera coordinate system; receiving virtual object data associated with the virtual object, wherein the virtual object data comprises information indicative of a shape of the virtual object; placing the virtual object in the virtual environment with a virtual object position and virtual object orientation corresponding the object position and object orientation, and based on the virtual object data; generating a model of the virtual environment based on three-dimensional location information associated with the virtual object; and generating the data that represents the virtual object based on the model of the virtual environment.

11. The method of clause 10, wherein the model of the virtual environment comprises a point cloud comprising a plurality of points, each of the plurality of points corresponding to a location of a portion of the virtual object in the virtual environment, and wherein the method further comprises: providing the plurality of points to the autonomy system, such that the autonomy system of the non-virtual marine vessel identifies the virtual object as a non-virtual object in the environment.

12. The method of any one of clauses 10 or 11, further comprising: determining that the virtual object is at least partially within the field of view of the first virtual camera; rendering, using the real-time graphics engine, a two-dimensional image of the virtual environment from a point of view of the first virtual camera based on the virtual object data; receiving image data from the first camera; generating a view of an extended reality (XR) scene based on the image data from the first camera and the two-dimensional image of the virtual environment, such that the virtual object appears to be present in the view of the XR scene at the object position and object orientation, wherein the XR scene includes a portion of the environment; and presenting, using a display device, the view of the XR scene.

13. The method of any one of clauses 10 to 12, further comprising: rendering, using the real-time graphics engine, a two-dimensional image of the virtual environment from a virtual camera point of view, wherein the virtual camera point of view is associated with a location within the virtual environment and a viewing angle with respect to the virtual environment, and wherein the two-dimensional image of the virtual environment includes a representation of a portion of the virtual object; and presenting, using a display device, the two-dimensional image of the virtual environment.

14. The method of clause 13, further comprising: rendering, using the real-time graphics engine, a second two-dimensional image of the virtual environment from a second virtual camera point of view, wherein the second virtual camera point of view is associated with a second location within the virtual environment and a second viewing angle with respect to the virtual environment, the second location is different than the location associated with the virtual camera point of view and the second viewing angle is different than the viewing angle associated with the virtual camera point of view, and wherein the second two-dimensional image of the virtual environment includes a second representation of the portion of the virtual object, and a representation of the digital twin; and presenting, using the display device, the second two-dimensional image of the virtual environment concurrently with presentation of the two-dimensional image of the virtual environment.

15. The method of clause 14, wherein the location and viewing angle associated with the virtual camera point of view is fixed with respect to the digital twin, such that the location and viewing angle changes as a position of the digital twin changes with respect to the virtual environment, and wherein the second location and the second viewing angle associated with the virtual camera point of view is fixed with respect to the virtual environment, such that a posture of the representation of the digital twin changes with respect to the second virtual camera point of view as a position of the digital twin changes with respect to the virtual environment.

16. The method of any one of clauses 13 to 15, further comprising: receiving information indicative of movement of the non-virtual marine vessel in the environment; updating a position of the digital twin in the virtual environment based on the information indicative of movement of the non-virtual marine vessel in the environment; and rendering, using the real-time graphics engine, a third two-dimensional image of the virtual environment from the virtual camera point of view based on the updated position of the digital twin in the virtual environment; and presenting, using the display device, the third two-dimensional image of the virtual environment.

17. The method of any one of clauses 10 to 16, further comprising: rendering, using the real-time graphics engine, a stream of two-dimensional images of the virtual environment from a virtual camera point of view as a position of the digital twin in the virtual environment is updated based on information indicative of movements of the non-virtual marine vessel in the environment, wherein the virtual camera point of view is associated with a location within the virtual environment and a viewing angle with respect to the virtual environment, and wherein the two-dimensional image of the virtual environment includes a representation of a portion of the virtual object; and storing the stream of the two-dimensional image of virtual environment the two-dimensional image of the virtual environment in non-volatile memory, such that evaluation of the one or more autonomous operations of the non-virtual marine vessel with respect to the virtual object is facilitated.

18. The method of any one of clauses 1 to 17, further comprising: simultaneously presenting, using a display device, a two-dimensional image representing at least a portion of the model of the environment, a two-dimensional image of the virtual environment, and a masked image based on an image of the environment.

19. A system comprising: one or more processors configured to: perform a method of any of clauses 1 to 18.

20. A non-transitory computer-readable medium storing computer-executable code, comprising code for causing a computer to cause a processor to: perform a method of any of clauses 1 to 18.

In some embodiments, any suitable computer readable media can be used for storing instructions for performing functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that above-described steps of the processes of FIGS. 5-8 can be executed or performed in any suitable order or sequence not limited to the order and sequence shown and described in the figures. Also, some of the above steps of the processes of FIGS. 5-8 can be executed or performed substantially simultaneously where appropriate or in parallel to reduce latency and processing times.

This written description uses examples to disclose the invention(s), including the best mode, and also to enable any person skilled in the art to make and use the invention(s). Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention(s) is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for placing a virtual object in an environment of a non-virtual marine vessel, the system comprising:

a plurality of cameras, including at least a first camera, wherein each of the plurality of cameras is configured to be mounted to the marine vessel with an associated field of view of an environment of the marine vessel, and wherein each of the plurality of cameras is associated with a three-dimensional camera coordinate system; and one or more hardware processors configured to:

determine three-dimensional location information associated with an object in the environment of the marine vessel in a three-dimensional global coordinate system based on a transform between the camera coordinate system associated with the first camera and the global coordinate system;

generate a model of the environment used to facilitate one or more autonomous operations of the non-virtual marine vessel based on the three-dimensional location information associated with the object;

receive an instruction to add a virtual object to the model of the environment;

receive information indicative of an object position and object orientation at which to place the virtual object within the environment with respect to the marine vessel;

add data that represents the virtual object to the model, such that an autonomy system of the non-virtual marine vessel identifies the virtual object as a non-virtual object in the environment;

receive an image from the first camera, wherein the image includes a portion of the environment that corresponds to a portion of the model of the environment that includes at least a portion of the virtual object;

receive segmentation information associated with the first camera, wherein the segmentation information includes classification information associated with features located in a field of view associated with the first camera, and classification information associated with the portion of the virtual object; and present, using a display device, a masked image based on the image and the segmentation information.

2. The system of claim 1, wherein each camera of the plurality of cameras comprises a stereoscopic camera.

3. The system of claim 1, wherein the one or more hardware processors are further configured to:

receive virtual object data associated with the virtual object, wherein the virtual object data comprises information indicative of a shape of the virtual object;

determine a position and orientation of the virtual object within the global coordinate system based on the information indicative of the object position and object orientation at which to place the virtual object;

identify one or more positions in the global coordinate system occupied by the virtual object based on the object position and the object orientation at which to place the virtual object, and the virtual object data; and add points corresponding to the one or more positions in the global coordinate system to the model of the of the environment.

4. The system of claim 1, wherein the model of the environment comprises a point cloud comprising a plurality of points, each of the plurality of points corresponding to a location on a surface of an object in the environment.

5. The system of claim 1, wherein the model of the environment comprises an occupancy grid comprising a plurality of cells, wherein a value associated with each cell is indicative of a probability that the cell is occupied by an obstruction in the environment.

6. The system of claim 5, wherein the one or more hardware processors are further configured to:

generate a two-dimensional image representing at least a portion of the model of the environment; and present, using a display device, the two-dimensional image representing at least a portion of the model of the environment.

7. The system of claim 1, wherein the one or more hardware processors are further configured to:

receive, from the autonomy system, a version of the model of the environment;

add the data that represents the virtual object to the version of the model based on the information indicative of the object position and object orientation at which to place the virtual object, thereby generating an updated model of the environment that includes the virtual object; and provide the updated model of the environment to the autonomy system, such that the autonomy system of the non-virtual marine vessel identifies the virtual object as a non-virtual object in the environment.

8. A method for placing a virtual object in an environment of a non-virtual marine vessel, the method comprising:

determining three-dimensional location information associated with an object in the environment of the marine vessel in a three-dimensional global coordinate system based on a transform between a camera coordinate system associated with a first camera and the global coordinate system, wherein a plurality of cameras, including the first camera, is configured to be mounted to the marine vessel with an associated field of view of an environment of the marine vessel, and wherein each of the plurality of cameras is associated with a three-dimensional camera coordinate system;

generating a model of the environment used to facilitate one or more autonomous operations of the non-virtual marine vessel based on the three-dimensional location information associated with the object;

receiving an instruction to add a virtual object to the model of the environment;

receiving information indicative of an object position and object orientation at which to place the virtual object within the environment with respect to the marine vessel;

adding data that represents the virtual object to the model, such that an autonomy system of the non-virtual marine vessel identifies the virtual object as a non-virtual object in the environment;

receiving an image from the first camera, wherein the image includes a portion of the environment that corresponds to a portion of the model of the environment that includes at least a portion of the virtual object;

receiving segmentation information associated with the first camera, wherein the segmentation information includes classification information associated with features located in a field of view associated with the first camera, and classification information associated with the portion of the virtual object; and presenting, using a display device, a masked image based on the image and the segmentation information.

9. The method of claim 8, wherein each camera of the plurality of cameras comprises a stereoscopic camera.

10. The method of claim 8, further comprising:

receiving virtual object data associated with the virtual object, wherein the virtual object data comprises information indicative of a shape of the virtual object;

determining a position and orientation of the virtual object within the global coordinate system based on the information indicative of the object position and object orientation at which to place the virtual object;

identifying one or more positions in the global coordinate system occupied by the virtual object based on the object position and the object orientation at which to place the virtual object, and the virtual object data; and adding points corresponding to the one or more positions in the global coordinate system to the model of the of the environment.

11. The method of claim 8, wherein the model of the environment comprises a point cloud comprising a plurality of points, each of the plurality of points corresponding to a location on a surface of an object in the environment.

12. The method of claim 8, wherein the model of the environment comprises an occupancy grid comprising a plurality of cells, wherein a value associated with each cell is indicative of a probability that the cell is occupied by an obstruction in the environment.

13. The method of claim 12, further comprising:

generating a two-dimensional image representing at least a portion of the model of the environment; and presenting, using a display device, the two-dimensional image representing at least a portion of the model of the environment.

14. The method of claim 8, further comprising:

receiving, from the autonomy system, a version of the model of the environment;

adding the data that represents the virtual object to the version of the model based on the information indicative of the object position and object orientation at which to place the virtual object, thereby generating an updated model of the environment that includes the virtual object; and providing the updated model of the environment to the autonomy system, such that the autonomy system of the non-virtual marine vessel identifies the virtual object as a non-virtual object in the environment.

15. A method for placing a virtual object in an environment of a non-virtual marine vessel, the method comprising:

receiving an instruction to add a virtual object to a model of the environment used to facilitate one or more autonomous operations of the non-virtual marine vessel;

receiving information indicative of an object position and object orientation at which to place the virtual object within the environment with respect to the marine vessel;

adding data that represents the virtual object to the model, such that an autonomy system of the non-virtual marine vessel identifies the virtual object as a non-virtual object in the environment;

generating, using a real-time graphics engine, a digital twin of the non-virtual marine vessel, wherein the digital twin comprises a plurality of virtual cameras, including at least a first virtual camera and a second virtual camera, wherein each of the plurality of virtual cameras is positioned with respect to the digital twin to have an associated field of view of a virtual environment of the digital twin of the marine vessel that corresponds to a field of view associated with a camera of a plurality of cameras, including at least a first camera and a second camera, each of the plurality of cameras is configured to be mounted to the marine vessel with an associated field of view of an environment of the marine vessel, and each of the plurality of cameras is associated with a three-dimensional camera coordinate system;

receiving virtual object data associated with the virtual object, wherein the virtual object data comprises information indicative of a shape of the virtual object;

placing the virtual object in the virtual environment with a virtual object position and virtual object orientation corresponding the object position and object orientation, and based on the virtual object data;

generating a model of the virtual environment based on three-dimensional location information associated with the virtual object; and generating the data that represents the virtual object based on the model of the virtual environment.

16. The method of claim 15, wherein the model of the virtual environment comprises a point cloud comprising a plurality of points, each of the plurality of points corresponding to a location of a portion of the virtual object in the virtual environment, and wherein the method further comprises:

providing the plurality of points to the autonomy system, such that the autonomy system of the non-virtual marine vessel identifies the virtual object as a non-virtual object in the environment.

17. The method of claim 15, further comprising:

determining three-dimensional location information associated with an object in the environment of the marine vessel in a three-dimensional global coordinate system based on a transform between a camera coordinate system associated with the first camera and the global coordinate system; and generating the model of the environment based on the three-dimensional location information associated with the object.

18. The method of claim 15, wherein each camera of the plurality of cameras comprises a stereoscopic camera.

19. The method of claim 15, further comprising:

determining a position and orientation of the virtual object within a global coordinate system using the model of the virtual environment; and adding points corresponding to one or more positions in the global coordinate system occupied by the virtual object to the model of the of the environment.

20. The method of claim 15, further comprising:

receiving an image from the first camera, wherein the image includes a portion of the environment that corresponds to a portion of the model of the environment that includes at least a portion of the virtual object;

receiving segmentation information associated with the first camera, wherein the segmentation information includes classification information associated with features located in a field of view associated with the first camera, and classification information associated with the portion of the virtual object; and presenting, using a display device, a masked image based on the image and the segmentation information.

* * * * *